US011416297B1

(12) United States Patent
Cory et al.

(10) Patent No.: US 11,416,297 B1
(45) Date of Patent: Aug. 16, 2022

(54) SYSTEMS AND METHODS FOR OPTIMIZATION OF DATA ELEMENT UTILIZATION USING DEMOGRAPHIC DATA

(71) Applicant: ADAP.TV, INC., Dulles, VA (US)

(72) Inventors: Amir Cory, Palo Alto, CA (US); Shubo Liu, Belmont, CA (US)

(73) Assignee: ADAP.TV, Inc., Dulles, VA (US)

( * ) Notice: Subject to any disclaimer, the term of this patent is extended or adjusted under 35 U.S.C. 154(b) by 59 days.

(21) Appl. No.: 16/895,857

(22) Filed: Jun. 8, 2020

Related U.S. Application Data

(63) Continuation of application No. 14/861,939, filed on Sep. 22, 2015, now Pat. No. 10,678,591.

(51) Int. Cl.
G06F 9/48 (2006.01)
G06F 9/50 (2006.01)
G06N 5/02 (2006.01)

(52) U.S. Cl.
CPC .......... *G06F 9/5011* (2013.01); *G06F 9/4881* (2013.01); *G06N 5/02* (2013.01)

(58) Field of Classification Search
CPC ........ G06F 9/5011; G06F 9/4881; G06N 5/02
See application file for complete search history.

(56) References Cited

U.S. PATENT DOCUMENTS

| 7,406,434 B1 | 7/2008 | Chang et al. |
| 2007/0011187 A1 | 1/2007 | Chitgupakar et al. |
| 2007/0073583 A1 | 3/2007 | Grout et al. |
| 2007/0078960 A1 | 4/2007 | Dawson et al. |
| 2008/0256458 A1 | 10/2008 | Aldred et al. |
| 2009/0063274 A1 | 3/2009 | Dublin, III et al. |
| 2009/0282016 A1 | 11/2009 | Gabrilovich et al. |
| 2011/0218866 A1 | 9/2011 | Wilson |
| 2012/0239612 A1 | 9/2012 | George et al. |
| 2013/0167151 A1 | 6/2013 | Verma et al. |
| 2013/0254196 A1 | 9/2013 | Babu et al. |

(Continued)

OTHER PUBLICATIONS

Roels et al., "Dynamic revenue management for online display advertising," Palgrave Macmillan, pp. 452-466 (Jan. 27, 2009) (http://files.pch.webnode.com/200000000-bae4dbbdea/rpm200910a.pdf).

(Continued)

*Primary Examiner* — Emerson C Puente
*Assistant Examiner* — Jonathan R Labud
(74) *Attorney, Agent, or Firm* — Bookoff McAndrews, PLLC

(57) ABSTRACT

Systems and methods are disclosed for optimizing distribution of resources to data elements, comprising receiving one or more user-defined objectives associated with a group of data elements, wherein at least one of the user-defined objectives includes an objective related to a selected target group; receiving one or more constraints associated with the group of data elements, wherein at least one of the constraints comprises resources apportionable to each data element in the group of data elements; developing a first prediction of a performance of the group of data elements during a time period based on the one or more user-defined objectives and the one or more constraints; and apportioning at least a portion of the resources to each data element in the group of data elements based on the first prediction once the time period has started.

20 Claims, 19 Drawing Sheets

(56) References Cited

U.S. PATENT DOCUMENTS

| | | |
|---|---|---|
| 2014/0081767 A1 | 3/2014 | Zhang |
| 2014/0201001 A1 | 7/2014 | Rellas et al. |
| 2014/0236710 A1 | 8/2014 | Nashed |
| 2015/0371272 A1* | 12/2015 | Vanderhook ........... G06Q 50/01 705/14.58 |
| 2017/0064365 A1 | 3/2017 | Chaar et al. |

OTHER PUBLICATIONS

Maharjan et al., "A Straighforward Author Profiling Approach to MapReduce," Springer, pp. 1-12 (Nov. 12, 2014) (http://secret.cis.uab.edu/media/iberamia_author_profile.pdf).

* cited by examiner

CAMPAIGNS

| IN FLIGHT (21) | UPCOMING (6) | ENDED (2) | ALL (29) | | | | | | | CREATE NEW ▼ |

SEARCH 🔍  FILTERS  ⚙

| CAMPAIGN/ GROUP/ DATA ELEMENT | START DATE | END DATE | PACING | IMPRESSIONS | SPEND | BID | CR | TARGETING | OPTIONS |
|---|---|---|---|---|---|---|---|---|---|
| ▸ FASTERADE DOG FOOD, NBA CAMPAIGN ● P2 | 9/15/2014 | 9/15/2014 | 0% | 0 | $0 | $0 | - | 0.00% | ⚙ |
| ▸ PRIVATE EXCHANGE DATA ELEMENT GROUP ● P1 | 7/01/2014 | 7/01/2014 | 17% | 715,939 | $997 | $0 | - | 1.54% | ⚙ |
| ▸ DIRECT INVENTORY DATA ELEMENT GROUP ● P1 | 9/22/2014 | 9/22/2014 | 26% | 696,635 | $9,334 | $0 | - | 1.76% | ⚙ |
| ▸ FASTERADE MARKETPLACE CAMPAIGN ● P1 | 7/01/2014 | 7/01/2014 | 0% | 0 | $0 | $0 | - | 0.00% | ⚙ |
| ▸ FASTERADE GROUP 1 ● P1 | 9/15/2014 | 9/15/2014 | 0% | 0 | $0 | $0 | - | 0.00% | ⚙ |
| ▸ FASTERADE GROUP 2 ● P2 | 7/01/2014 | 7/01/2014 | 0% | 0 | $0 | $0 | - | 0.00% | ⚙ |
| ▸ TEST GROUP ● P2 | 9/22/2014 | 9/22/2014 | 0% | 0 | $0 | $0 | - | 0.00% | ⚙ |

*FIG. 5*

ALL CAMPAIGNS/ SAMPLE CAMPAIGN/ NEW DATA ELEMENT GROUP

NEW DATA ELEMENT GROUP

| GENERAL | BID & OPTIMIZATION | DATA ELEMENTS |

GENERAL OPTIONS

515 — STATUS ⦿ PAUSED ○ LIVE

DATA ELEMENT GROUP NAME* [NEW DATA ELEMENT GROUP]

605 — NOTES [ ]

607 { START #1* [📅] [▼] [MM/DD/YYYY] [🕐] [12:00 AM] ET
     END #1*   [📅] [▼] [MM/DD/YYYY] [🕐] [11:59 PM] ET

610 — [+ FLIGHT]

DATA ELEMENT GROUP GOAL

615 — DATA ELEMENT GROUP GOAL* [$] [AMOUNT] [USD] [SPEND] [◆] [TOTAL] [◆]
620 — ENABLE AUTO ALLOCATION ACROSS DATA ELEMENTS ⦿ ON ○ OFF

ALL CAMPAIGNS/ SAMPLE CAMPAIGN/ NEW DATA ELEMENT GROUP

NEW DATA ELEMENT GROUP

| GENERAL | BID & OPTIMIZATION | DATA ELEMENTS |

DELIVERY

705 —— FREQUENCY CAPPING  ◯ YES  ◉ NO

BILLING

710 —— PRICE  $ [CPM AMOUNT]  [USD]  [CPM]

715 —— BUYER MARGIN  [PERCENTAGE]  [% OF MEDIA COSTS AND VENDOR FEES]

720 —— PASS-THROUGH COST  $ [CPM AMOUNT]  [USD]  [CPM]

| ALL CAMPAIGNS/ 888 HOLDINGS, VIDEO EU, 2014 | / TOYOTA INTENDERS DATA ELEMENT GROUP I |

NEW DATA ELEMENT

| DATA ELEMENT SUMMARY | GENERAL | INVENTORY | TARGETING | CREATIVES | BID & OPTIMIZATION |

GENERAL OPTIONS

1005 — STATUS ◉ PAUSED ○ LIVE

1010 — DATA ELEMENT NAMES* [NEW DATA ELEMENT]

1015 — DATA ELEMENT GROUP [TOYOTA INTENDERS DATA ELEMENT GROUP I]

NOTES [ ]

1020 — START #1* [📅 ▼] [MM/DD/YYYY] [🕐] [12:00 AM] ET
END #1* [📅 ▼] [MM/DD/YYYY] [🕐] [11:59 PM] ET
[+ FLIGHT]

1025 — GOAL #1* [# OF IMPRESSIONS] [IMPRESSIONS ⇕]
[+ GOAL]

1030 — MINIMUM GOAL ◉ YES ○ NO
[# OF IMPRESSIONS] [IMPRESSIONS ⇕] [TOTAL]

✓ ALL   ✗ NONE

1505 — ENTER KEYWORDS

1510 — ☐ 2.W-APP-COMPLETE

1515 — ☐ EMAIL-SIGNUP

1520 — ☑ ENTRANCE-POP-SIGNUP

1525 — ☑ EXIT-POP-SIGNUP

1530 — ☐ FREE-TRIAL

1535 — ☐ INDEED-SPONSORSHIP

1540 — ☐ INDEED-SPONSORSHIP.INVALIDCODE

*FIG. 15*

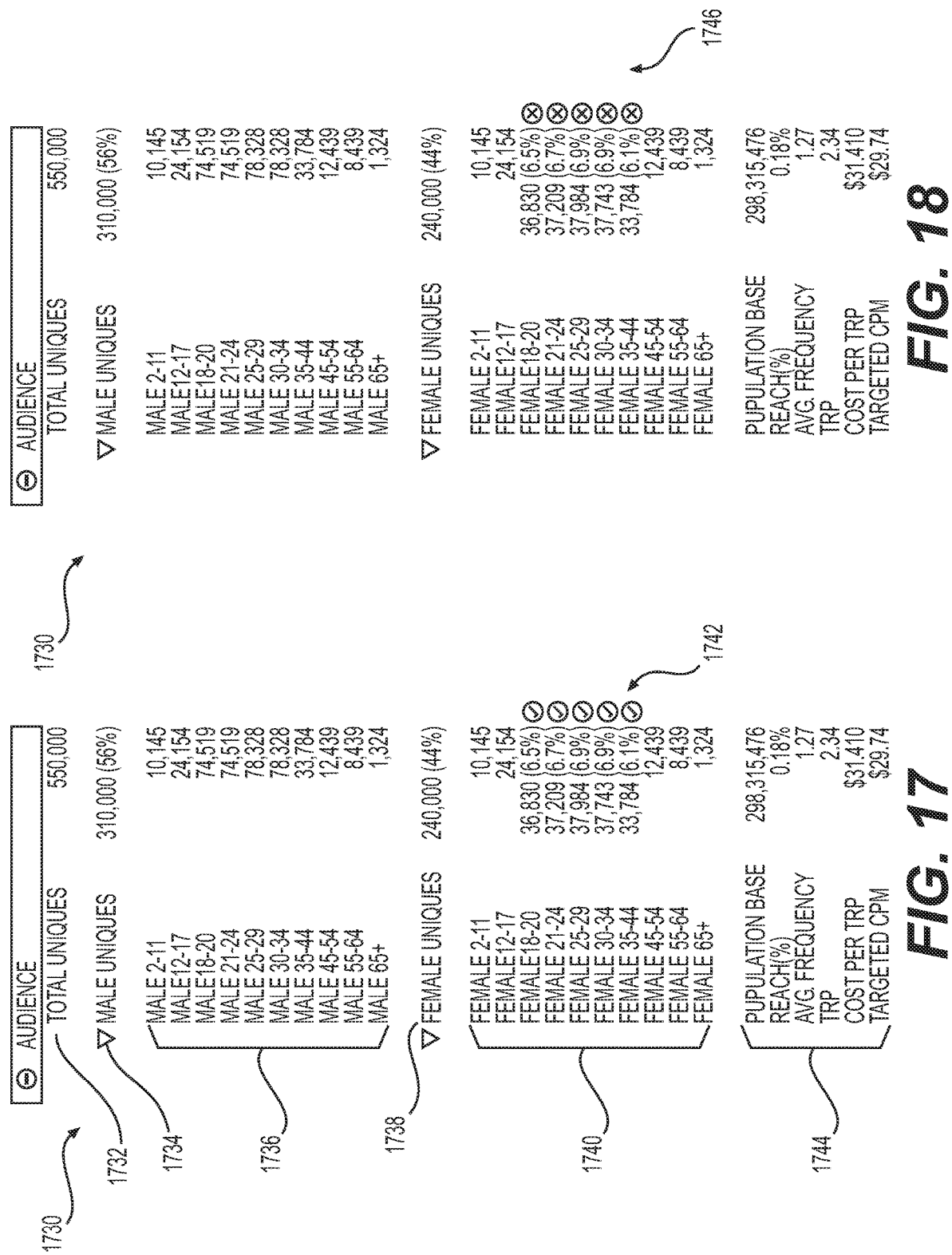

SYSTEMS AND METHODS FOR OPTIMIZATION OF DATA ELEMENT UTILIZATION USING DEMOGRAPHIC DATA

CROSS-REFERENCE TO RELATED APPLICATION(S)

This patent application is a continuation of and claims the benefit of priority to U.S. Non-provisional patent application Ser. No. 14/861,939, filed on Sep. 22, 2015, the entirety of which is incorporated herein by reference.

TECHNICAL FIELD

The disclosure generally relates to the field of data element optimization. More specifically, the disclosure relates to optimizing data element usage using demographic data.

BACKGROUND

Conventional data element optimization is a complex and time consuming process, and is often not quantified. For example, producers of online videos and other data elements (e.g., electronic or online ads or creatives) promoting products and/or services may have a limited budget. Based on limited data, the producers may choose to use one promotional data element more often than another, but this decision is often based on subjective feelings about the merits of the data element's content.

Further, producers of data elements often have a plurality of objectives and constraints associated with the promotion of products and services. Prioritizing the objectives relative to each other while meeting all constraints is difficult, if not impossible, in real time.

SUMMARY OF THE DISCLOSURE

Systems and methods are disclosed for optimizing distribution of resources to data elements, which may comprise receiving one or more user-defined objectives associated with a group of data elements, wherein at least one of the user-defined objectives includes an objective related to a selected target group; receiving one or more constraints associated with the group of data elements, wherein at least one of the constraints comprises resources apportionable to each data element in the group of data elements; developing a first prediction of a performance of the group of data elements during a time period based on the one or more user-defined objectives and the one or more constraints; apportioning at least a portion of the resources to each data element in the group of data elements based on the first prediction once the time period has started; after a portion of the time period has elapsed, receiving data indicating an actual performance of the data element relative to the selected target group; adjusting the objective related to the selected target group based on the actual performance of the data element during the elapsed portion of the time period; developing an updated prediction of a performance of the group of data elements during a remaining portion of the time period based on the adjusted objective related to the selected target group; and automatically revising the at least a portion of resources associated with each data element in the group of data elements based on the updated prediction.

Systems and methods disclosed herein may further disclose wherein the first prediction is developed by simulating the performance of the group of data elements under the one or more constraints in an environment that simulates available data element inventories based on previously available data element inventories.

Systems and methods disclosed herein may further disclose wherein the data elements are configured to be associated with a data element inventory by apportioning resources to an owner of the data element inventory.

Systems and methods disclosed herein may further disclose wherein the selected target group includes a gender selection of male, female, or male and female, and an age group selection Systems and methods disclosed herein may further disclose wherein the actual performance of the data element relative to the selected target group includes a performance of the data element among persons within the gender selection and the age group selection.

Systems and methods disclosed herein may further disclose wherein receiving data indicating the actual performance of the data element relative to the selected target group includes establishing a connection with a third party server configured to collect the number of impressions collected by the data element during the elapsed portion of the time period.

Systems and methods disclosed herein may further disclose wherein developing the first prediction includes determining whether the one or more user-defined objectives can be met using a lower constraint than the one or more constraints, and if so, apportioning the resources to each data element in the group of data elements using the lower constraint.

Systems and methods disclosed herein may further disclose wherein automatically revising the at least a portion of resources associated with each data element in the group of data elements based on the updated prediction includes using a higher constraint than the effective constraint if the updated prediction determines that the one or more user-defined objectives can no longer be met using the effective constraint.

Systems and methods disclosed herein may further disclose wherein automatically revising the at least a portion of resources associated with each data element in the group of data elements based on the updated prediction includes using a lower constraint than the one or more constraints if the updated prediction determines that the one or more user-defined objectives can be met using a lower constraint.

Systems and methods disclosed herein may further disclose wherein apportioning at least a portion of the resources to each data element in the group of data elements includes associating each data element in the group of data elements with an available data element inventory using a portion of the resources.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

FIG. 5 is an example user interface displaying data elements and data element groups.

FIG. 6 is an example user interface enabling the creation of one or more data element groups according to techniques presented herein.

FIG. 7 is an example user interface enabling the creation of one or more data element groups according to techniques presented herein.

FIG. 10 is an example user interface enabling the creation and/or selection of data elements that may be associated with a data element group.

FIG. 11 is an example user interface displaying objectives for optimizing data element usage according to techniques presented herein.

FIG. 14 is an example user interface enabling the selection of objectives associated with groups of data elements according to techniques presented herein.

FIG. 15 is an example user interface enabling the selection of electronic events associated with groups of data elements according to techniques presented herein.

FIGS. 16-18 are example user interfaces displaying forecasted performance of data elements according to techniques presented herein.

DETAILED DESCRIPTION

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
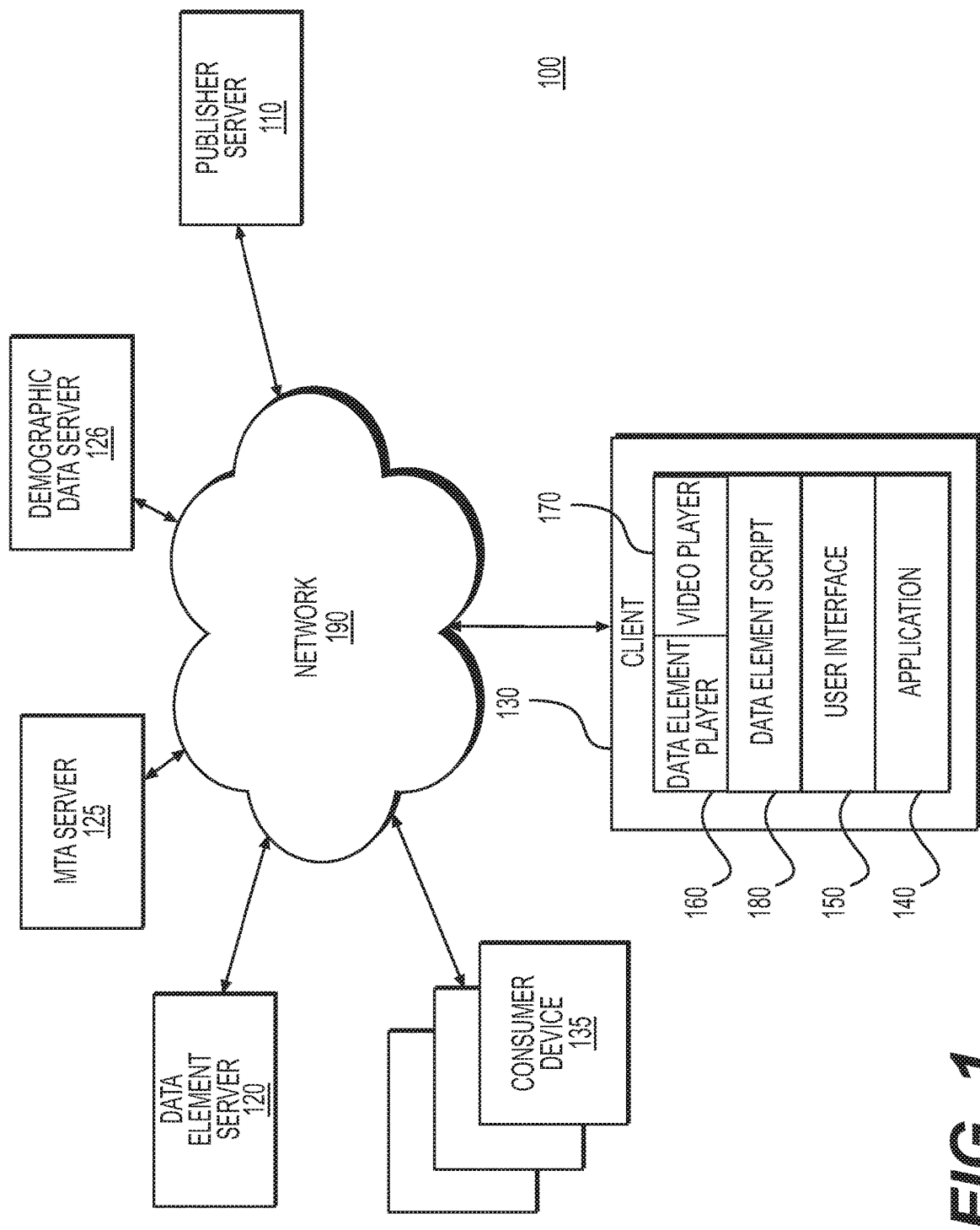
FIG. 1 is a high-level block diagram illustrating a system for dynamically optimizing the use of data elements in accordance with objectives and constraints.

FIG. 1 is a high-level block diagram of a computing environment 100 for dynamically optimizing data elements according to one embodiment. The computing environment 100 may include a publisher server 110, a data element server 120 (or "ad server"), a multi-touch attribution ("MTA") server 125, a demographic data server 126, any number of consumer devices 135, and any number of client devices 130 communicatively coupled by a network 190, such as the Internet. In one embodiment, the publisher server 110, the data element server 120, the MTA server 125, and the demographic data server 126 may be web servers. In another embodiment, the publisher server 110, MTA server 125, and demographic data servers 126 may be application servers that provide an instance of one or more applications 140 to the client device 130. In yet another embodiment, the publisher server 110, data element server 120, MTA server 125, and/or demographic data server 126 may provide data to support the execution of the one or more applications 140 on the client 130. The client device 130 is a computer or other electronic device which may be used by one or more users to perform activities which may include browsing web pages on the network 190, or using the one or more applications 140. The client device 130, for example, may be a personal computer, personal digital assistant (PDA), or a mobile telephone. Only one publisher server 110, one data element server 120, one MTA server 125, one demographic data server 126, and one client device 130 are shown in FIG. 1 in order to simplify and clarify the description. Other embodiments of the computing environment 100 may include any number of publisher servers 110, data element servers 120, MTA servers 125, demographic data servers 126, and/or client devices 130 connected to the network 190. Further, while the publisher server 110 and data element server 120 are depicted as separate in the example of FIG. 1, the features of the publisher server 110, data element server 120, MTA server 125, and demographic data server 126 may be integrated into a single device on the network 190. The MTA server 125 may provide multi-touch attribution services, as will be discussed further herein. The demographic data server 126 may provide demographic performance data of data elements, as will be discussed further herein.

The network 190 represents the communication pathways between (e.g., communicatively coupled) the publisher server 110, data element server 120, MTA server 125, demographic data server 126, and client device 130. In one embodiment, the network 190 is the Internet. The network 190 may also include dedicated or private communications links that are not necessarily a part of the Internet. In one embodiment, the network 190 uses various communications technologies and/or protocols. Thus, the network 190 may include links using technologies such as Ethernet, 802.11, integrated services digital network (ISDN), digital subscriber line (DSL), asynchronous transfer mode (ATM), etc. Similarly, the networking protocols used on the network 190 may include the transmission control protocol/Internet protocol (TCP/IP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of links may be encrypted using encryption technologies such as the secure sockets layer (SSL), transport layer security (TLS), secure HTTP (HTTPS), and/or virtual private networks (VPNs). In another embodiment, the entities may use custom and/or dedicated data communications technologies instead of, or in addition to, the ones described above.

As shown in FIG. 1, client device 130 may execute an application 140, such as a web application or browser, that allows a user to retrieve and view content stored on other computers or servers on the network 190. The application 140 may also allow the user to submit information to other computers on the network 190, such as through user interfaces 150, web pages, application program interfaces (APIs), and/or other data portals. In one embodiment, the application 140 is a web browser, such as MICROSOFT INTERNET EXPLORER or MOZILLA FIREFOX. The application 140 may support technologies including JavaScript, ActionScript, and other scripting languages that allow the client device 130 to perform actions in response to scripts and other data sent to the application via the network 190. The application 140, as further discussed herein, may also utilize data and/or other services from MTA server 125. In some embodiments, functions ascribed herein to the application 140 are implemented via plug-ins such as ADOBE FLASH. In some embodiments, the application 140 may present a demand-side platform ("DSP") to users (which may be authorized users), which enables would-be advertisers or agents thereof to purchase ad space.

Any number of consumer devices 135 may also connect to the network 190, which may enable consumers of network content to view data elements such as advertisements distributed using the application 140. While the client device 130 is depicted as having a data element player 160, video player 170, and data element script 180, these entities and more may be present on any or all of the consumer devices 135. In addition, many of the attributes and behavior of a client device 130 may be also present or implemented on the consumer device 135.

The publisher server 110 may deliver data associated with a user interface 150, such as a web page, to the application 140 over the network 190. The publisher server 110 may also communicate with MTA server 125, and act as a relay for information between the application 140 and the MTA server 125, including information which may be utilized when rendering a user interface 150. The application 140 may then load the user interface 150 and present it to the user. User interface 150 may correspond to any of the user interfaces discussed herein, and any of the user interfaces which may be displayed by application 140. The user interface 150 may include a video player 170 for presenting online videos and a data element player 160 which may present electronic advertisements and/or other promotional materials to the user of client device 130 and/or consumer using the consumer device 135. The data element player 160 may be used to display any of the data elements discussed herein to a user. The video player 170 can be any video player suitable for online video such as WINDOWS MEDIA PLAYER, REALPLAYER, QUICKTIME, WINAMP, or any number of custom video players built to run on a suitable platform such as the Adobe Flash platform.

The data element player 160 may comprise JavaScript, ActionScript and/or other code executable by the application 140 that may be delivered to the client device 130 in addition to or as part of the user interface 150. A data element script 180 may contain code readable and/or transformable by the data element player 160 into operational instructions that govern behavior of the data element player 160. The application may execute the data element player 160 natively, directly (e.g., as JavaScript) or via a browser plug-in module (e.g., as a Flash plug-in). The data element player 160 may communicate with the data element server 120 over the network 190 to request and receive content for presentation on the client device 130. A data element may comprise any computer-executable code (e.g., JavaScript, ActionScript, Flash, or HTML) whose execution may result in the presentation of text, images, and/or sounds to the user. The text, images, and/or sounds may promote one or more products, services, viewpoints and/or actions. A data element can be a linear data element (i.e., promotional content that interrupts the presentation of a video) or a non-linear data element (i.e., promotional content that is presented concurrently with a video) presented either before, during, or after the video. A data element can also be textual, graphical (such as a banner promotion), or a video promotion. A data element can be presented as overlaying the online video or in any other position within the user interface 150. A data element can also be interactive and, in one embodiment, a data element can transition from one of the aforementioned varieties of promotional data elements to a different variety or trigger an additional data element in response to an action by the user of client 130 or consumer using a consumer device 135.

The MTA server 125 may provide multi-touch attribution data and/or functionality to the one or more applications 140. Consumer decisions are often complex, and cannot be attributed to a single source. If a consumer purchases a particular model of a car, for example, that decision may be the result of many factors. There may have been many magazine articles, web advertisements, video reviews, and other factors (or "touches") that led to that decision. Multi-touch attribution, as disclosed herein, allows for tracking and analysis of these factors, which allows for a more granular understanding of consumer behavior, and return on investment ("ROI") determinations that were not possible prior to the Internet.

Software code may be associated with or embedded in advertisements, articles, videos, audio, or any form of consumer multimedia. The code may collect multi-touch attribution ("MTA") data on the consumers views, mouse clicks, searches, listening preferences, and/or other behaviors, and make it available to an MTA server 125, or other devices. This MTA data may be used for analyzing the behavior of the users of electronic devices, and may further be used to analyze consumer behavior in order to optimize advertising. Multi-touch analysis may be performed, whether on the MTA server or elsewhere, using any number of algorithms which may apply weights to each touch. The weights may be applied in any number of ways. For example, all consumer exposures to car-related media may be weighted equally. Exposures further back in time may be weighted less, first exposures may be weighted more, proactive exposures may be weighted more (e.g., the consumer searches for the car in a browser), and/or concentrated exposures in the exposure timeline may be weighted more, etc. Using the MTA data and any applied weights, an ROI may be calculated, which may be based on costs, such as in advertising costs, and the conversion data. Using historical MTA data, ROI may be forecast, for example by the MTA server 125, publisher server 110, and/or client device 130, as will be discussed further herein.

Figure 2:
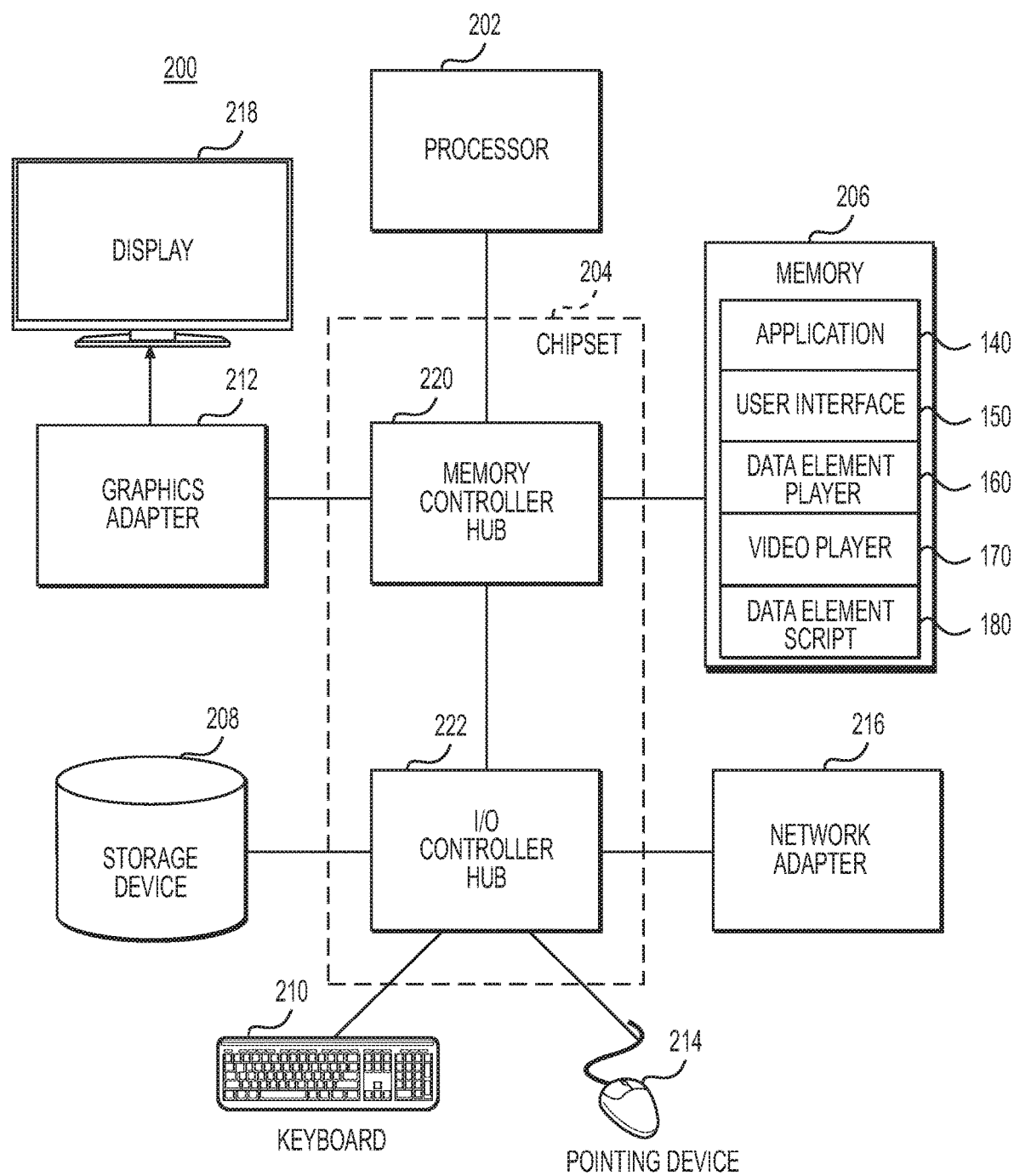
FIG. 2 is a high-level block diagram illustrating an example of a computer for use as a server and/or as a client according to techniques presented herein.

FIG. 2 is a high-level block diagram illustrating on example of a computer 200 for use as a client device 130, consumer device 135, and/or as a server, such as a publisher server 110, a data element server 120, or an MTA server 125. Illustrated are at least one processor 202 coupled to a chipset 204. The chipset 204 may include a memory controller hub 220 and/or an input/output (I/O) controller hub 222. A memory 206 and a graphics adapter 212 may be coupled to the memory controller hub 220, and a display 218 is coupled to the graphics adapter 212. A storage device 208, keyboard 210, pointing device 214, and network adapter 216 may be coupled to the I/O controller hub 222. Other embodiments of the computer 200 have different architectures. For example, the memory 206 may be directly coupled to the processor 202 in some embodiments.

The computer 200 may be adapted to execute computer program modules for providing the functionality described herein. As used herein, the term "module" refers to computer program logic configured and used to provide the specified functionality. Thus, a module can be implemented in hardware, firmware, and/or software. In one embodiment, program modules are stored on the storage device 208, loaded into the memory 206, and executed by the processor 202. The storage device 208 is a computer-readable storage medium such as a hard drive, compact disk read-only memory (CD-ROM), DVD, or a solid-state memory device. The memory 206 is also a computer-readable storage medium and stores computer-executable instructions and data used by the processor 202.

In one embodiment, the memory 206 stores computer-executable instructions that cause the processor 202 to implement a method for displaying data elements. The computer-executable instructions stored by the memory comprise instructions for the application 140. In one embodiment, after delivery of the user interface 150 and data element script 180 to the client device 130 by the publisher server 110, the computer-executable instructions stored by the memory 206 further comprise instructions for the user interface 150, the data element player 160, the video player 170, and the data element script 180 as shown in FIG. 2.

The pointing device 214 may be a mouse, track ball, touch screen, or other type of pointing device, and is used in combination with the keyboard 210 to input data into the computer system 200. The graphics adapter 212 displays images and other information on the display 218. The network adapter 216 couples the computer system 200 to the network 190. Some embodiments of the computer 200 have different and/or other components than those shown in FIG. 2.

The types of computers 200 used by the entities of FIG. 1 can vary depending upon the embodiment and the processing power required by the entity. For example, a client device 130 that is a mobile telephone typically has limited processing power, a small display 218, and might lack a pointing device 214. A server providing a data element server 120, in contrast, might comprise multiple servers working together to provide the functionality described herein. Also, a server typically lacks hardware such as the graphics adapter 212, the display 218, and user input devices.

Some portions of the above description describe embodiments in terms of algorithms and symbolic representations of operations on information. For example, the description corresponding to FIGS. 2-12 relate to techniques that optimize data element usage. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to depict to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Software and firmware configurations of the modules and corresponding instructions described above can be stored in, for example, the storage device 208 and/or the memory 206 and can be executed by, for example, the processor 202, adapters 212, 216, controllers 220, 222, and/or multiple such devices operating in parallel.

Figure 3:
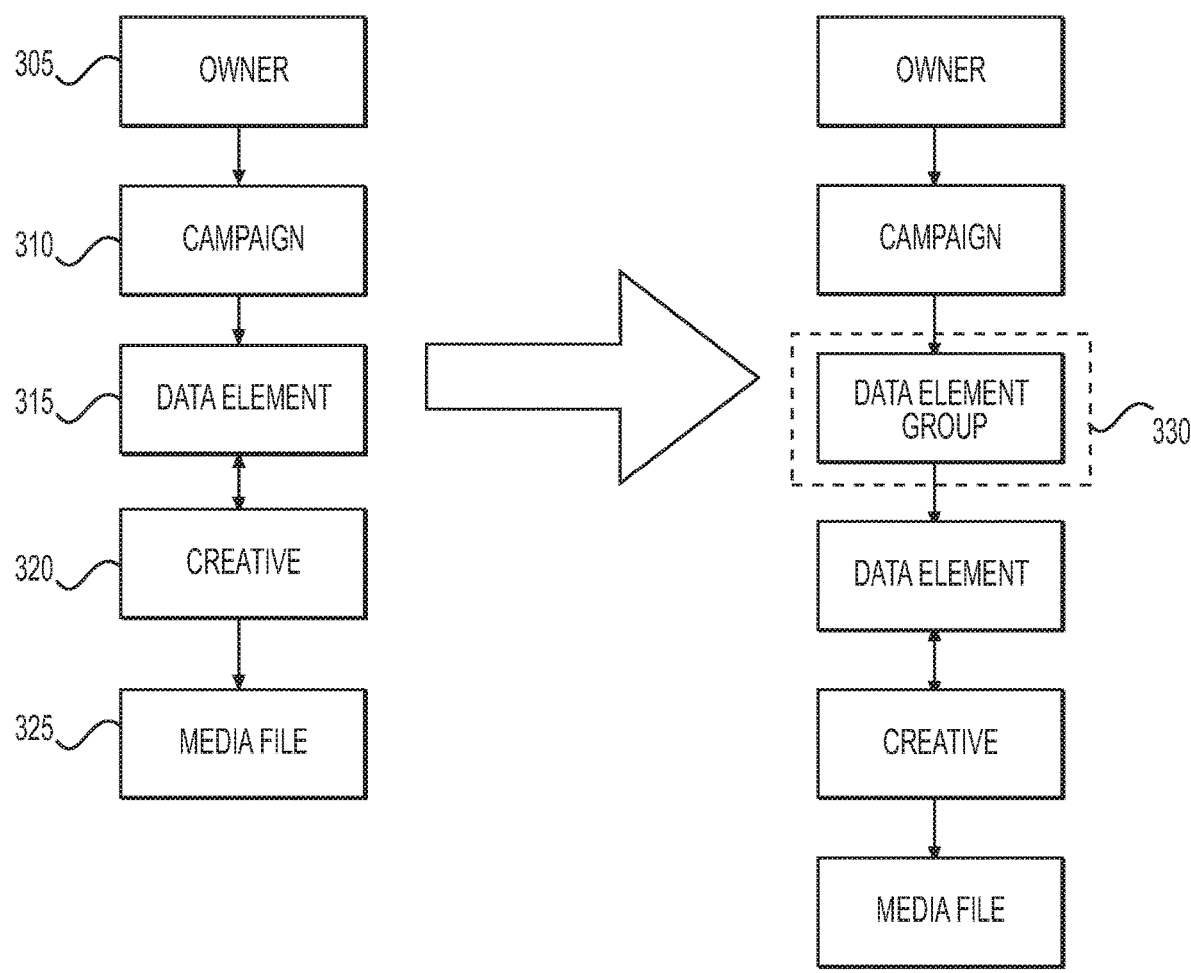
FIG. 3 is a block diagram illustrating an example object hierarchy according to techniques presented herein.

FIG. 3 illustrates a block diagram of an object hierarchy according to techniques presented herein. In one technique, an owner 305, who may be a creator and/or producer of data elements, such as promotional data elements, and may be a buyer of promotional space, may manage or otherwise own one or more campaigns 310. In general herein, a user of the application 140 and/or client device 130 will be referred to as a "user," though the user may or may not be the owner 305 (the user may be, for example, an advertiser running campaign via client 130). A campaign 310 may be a collection of one or more data elements 315 that share a common idea or theme. As discussed above, a data element 315 may comprise any computer-executable code whose execution may result in the presentation of text, images, and/or sounds to the user. Each data element 315 may further comprise one or more creatives 320, each of which may correspond to at least a portion of the text, images, and/or sounds presented to the user. Finally, each creative 320 may further comprise one or more media files 325, such as textual, image, and/or audio files.

In another technique, data elements may be organized into one or more data element groups 330. The data element group 330 may enable users to more effectively plan and optimize the meeting of constraints relating to data elements that share common objectives and/or budgets. For example, a user may have a business objective of programming allocating resources, such as a budget, across promotional data elements in the most cost-effective manner. The data element group 330 object may allow the owner to organize groups of data elements 315 that share one or more common objectives. While one campaign may be associated with a plurality of data element groups, the application may enforce a rule that data element groups cannot be shared across multiple campaigns. Further, the application may require that at least one data element 315 be associated with a data element group 330. While data elements 315 may be associated with a data element group 330, the application may allow data elements 315 to remain unassociated with a data element group 330.

As will be shown, techniques discussed herein may allow an owner 305 to monitor data element group 330 performance via one or more user interfaces 150. Owners 305 may be able to forecast supply, pricing, and performance associated with data elements 315 and data element groups 330. Owners may also be able to programmatically optimize budget allocation across data elements that perform the best according to one or more objectives and/or one or more constraints. Owners may further be able to manually optimize allocations of resources, and may allocate more resources, such as a budget, to better performing data elements. Owners may also be able to run reports against data element group performance, further enabling the selection of the most effective data elements for reaching a given set of objectives and constraints.

Figure 4:
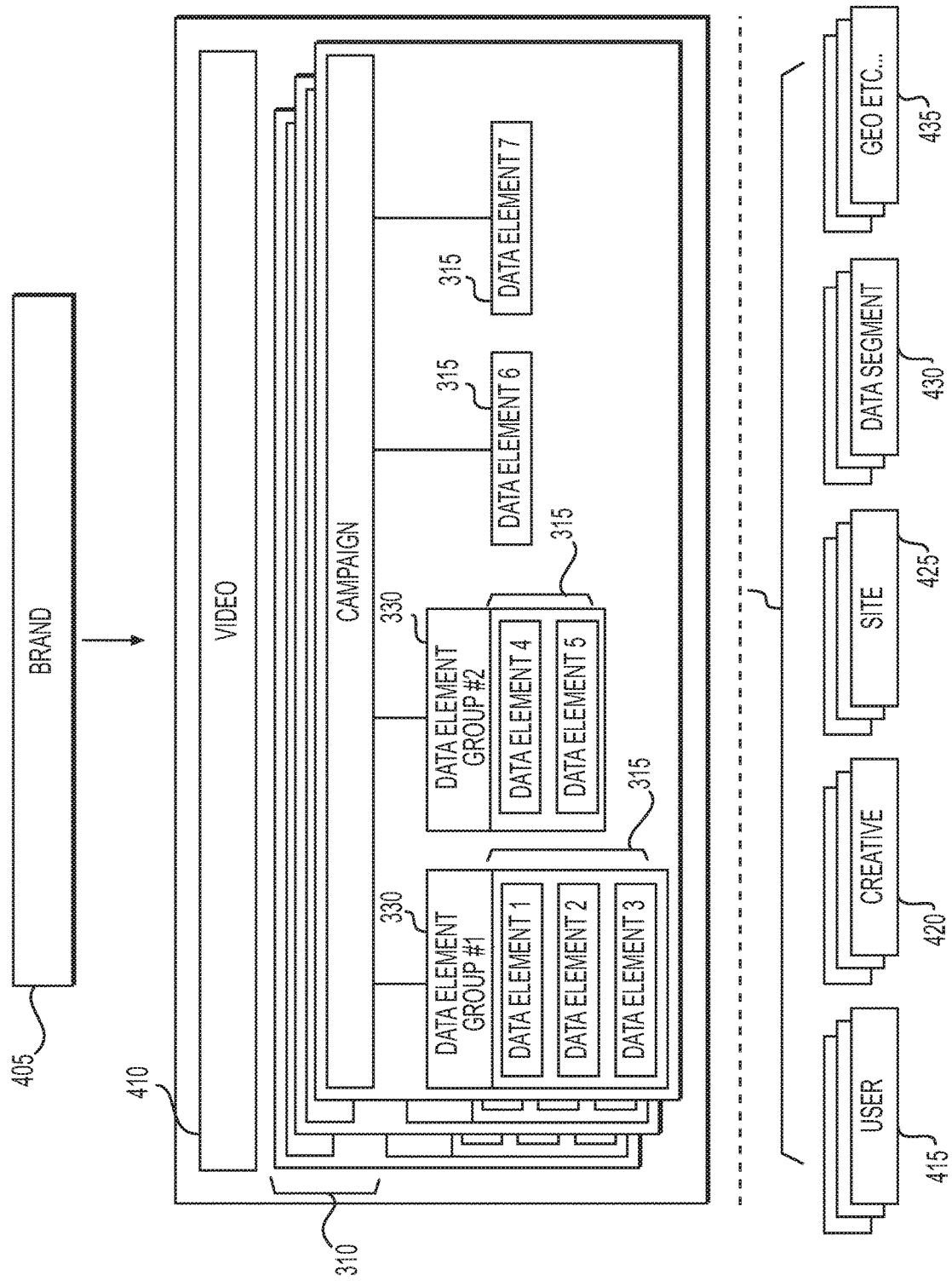
FIG. 4 is a block diagram illustrating an example of the grouping of data elements into data element groups according to techniques presented herein.

FIG. 4 is a block diagram illustrating an example of the grouping of data elements into data element groups according to techniques presented herein. As discussed above, data elements may be used as promotional content, and may be associated with a brand 405. The medium for the presentation of promotional content may be video 410, although other mediums would be consistent with techniques presented herein. A given brand 405 may have a one or more associated campaigns 310. Each campaign 310 may, in turn, have any number of data element groups 330 and any number of data elements 315 associated therewith. Constraints may be set at the campaign level, for example, for resource constraints, such as a budget. These constraints may bind objects lower on the object hierarchy, such as individual data element groups 330 and data elements 315. Similarly, constraints set at the data element group level 330 may bind data elements 330 associated with the data element groups 330.

Data element groups 330 may be created by an owner 305, or some other administrator or sufficiently privileged user. Alternatively, data elements may have associated tags and/or properties, and data elements 315 may be automatically grouped into data element groups 330 based upon these tags and/or properties. For example, data elements 315 sharing similar optimization objectives and/or maximum effective cost per thousand impressions ("eCPM") may be grouped under one data element group 330. Forecasts of delivery and/or key performance indicators ("KPIs") may be determined and/or viewed at the data element group 330 level as well at the level of individual data elements within the data element group. Budgets may be automatically allocated across multiple data elements 315 within a given data element group 330.

One or more users 415, which may correspond to one or more owners 305, may access the application in order to create and associate data element groups 330 and data elements 315. The data element groups 330 and data elements 315 may utilize one or more creatives 420, which may be stored in a data store, such as storage device 208. Data element groups 330 and/or data elements 315 may further be utilized in relation to one or more sites 425, such as websites, and segments 430. Sites 425 may be used to target certain topics, for example sports and/or entertainment. Segments 430 may be target audience objects. For example, a data segment 430 object may represent females 18 and over. Data element groups 330 and/or data elements 315 may also be utilized in relation to geographic areas 435. For example, a data element group may contain only promotional data elements that are to be run in a particular geographic region.

As discussed herein, objectives and/or constraints may be optimized in order to meet or exceed the one or more objectives within any constraints. For example, objectives may be to hit a target eCPM for a given budget, to maximize target impressions, to maximize the completion rate, and/or to maximize the click-through rate. Any number of other objectives/goals/KPIs may be used. Optimization, for example of a budget, may occur in multiple ways. Optimization may occur across video channels, for example by optimizing how much of a budget to apportion to each video channel given an assessment of the effectiveness of the channel towards meeting the one or more objectives. Optimization may also occur across multiple campaigns 310, a campaign being a collection of related data elements 315 and/or data element groups 330. One campaign may be determined to be more effective than another campaign in a certain medium or in promoting a certain brand, and resources may be balanced accordingly. Optimization may further occur across data element groups 330 within a given campaign. Some data element groups may prove to be more effective at meeting objectives and constraints than others, and resources may be continually rebalanced accordingly. This optimization may include data elements that are not affiliated with data element groups. Optimization may further occur across data elements, such as the data elements within a given data element group. In this manner, individual data elements that perform better for a given set of objectives and/or constraints may be given more resources or otherwise utilized more frequently. Further, optimization may be applied at the level of creatives, which may comprise a portion or version of a given data element. Optimization may also occur when selecting an optimal price of a bid, if, for example, bidding for space to promote data elements. Thus, optimization may occur at one or many levels of the object hierarchies shown in FIG. 3.

FIG. 5 is an example campaign user interface 500 displaying data elements and data element groups. The campaign user interface 500 may display any campaigns 505 to which the application user has access to view, such as any and all campaigns associated with a given owner 305. The campaign user interface 500 may also display any data element groups and/or independent data elements associated with each campaign. Each campaign 505 may have associated data element groups listed beneath, which may themselves have associated data elements listed beneath. The data element groups, data elements, and campaign listings may be expanded by default, contracted by default, or some items may be expanded or contracted, according to user preference. For example, a user may select that campaigns 505 are expanded, showing all associated data element groups associated therewith, but the data element groups themselves may be contracted by default, such that the user cannot immediately see the data elements associated with each data element group.

The campaign user interface 500 may further display fields associated with each campaign, such as the campaign's name 510, active/inactive status 515, start and end dates 520, pacing 525, impressions 530 (number of times a data element is presented to a member of the target audience), amount spend 535 thus far, bid 540 (which may comprise the average bid for impressions of a promotional data element, or per thousand impressions, etc.), click rate 545, targeting 550, and other options 555.

Pacing 525 may indicate a rate at which data elements are being made available relative to a goal. For example, in advertising, if a data element has a spend goal of $10 over a 10 second period, pacing is 100% if $10 is actually spent delivering the data element to an audience during that time. Pacing would be 200% if $20 was spent delivering the data element during that time period, and so on.

Targeting may be a filtering mechanism to make sure that promotional data elements run against a qualified pool of inventory and audience. For example, certain devices (e.g., only tablet computers), platforms (e.g. only Android), topics (e.g., only sites that over index for sports), audience segments (e.g., only females 18 and up), time periods (e.g., only evenings), may be specifically targeted. Techniques discussed herein may attempt to optimize for targeting to find the most valuable impressions for the cost. An inventory may be an available space that a publisher or owner has available to sell to a user of application 140 for placement of a data element group. That is, a data element group may be associated with an available inventory for some cost or exchange of resources.

A user of application 140 might create a new data element group in the campaign user interface 500 in a number of ways. For example, the user might select "create new" 510 to create a new data element group for association with a certain campaign. A user may also be able to clone an existing data element group, which may clone the data element group and any associated data elements. A user may also be able to create or delete data elements within a data element group, or data elements that are unaffiliated with a data element group.

FIG. 6 is an example user interface 600 allowing the creation of one or more data element groups according to techniques presented herein. When a user selects to create a new data element group, user interface 600 may be displayed, where a user may be able to select general settings, objectives, and/or constraints for the data element group. These selections may automatically propagate to any data elements associated with the data element group. Settings selected in the data element group user interface 600 may be reflected in the campaign user interface 500.

The user may also select a status 515 of the data element group, which may reflect whether any data elements in the data element group may be used in the real world, such as for advertising. The data element group may be "paused" by default, such that ad space associated with the data elements of the data element group would not be obtained. If the data element group is set to "live," a user may still be able to individually pause data elements associated with the data element group.

The user may further select a data element group name 510, and may designate any notes or comments 605 about the data element group. The user may also select one or more start and end dates 607 of the data element group, which may represent dates promotional data elements may run in one or more forms of media. Additional start and end dates may be designated, such as by selecting a flight option 610. As used herein, a period between a start and end date may be known as a "flight."

The user may also designate a data element group goal 615, which may indicate a total budget (spend total) for the data element group. The user may also be able to switch auto-allocation 620 on and off, which enables automatic optimization of data elements associated with the data element group, as will be further described herein. The objectives may be optimized across data elements of the data element group based on "mid-flight" metrics or other performance data. Once a minimum level of performance data is obtained, usage of a given data element and budget associated therewith may be refined at regular time intervals, such as daily. If the user turns off automatic allocation 620, the user may still be able to manually allocate data element goals for data elements, for example in the data elements tab.

Goals or objectives set at the data element group level may be set to adhere to goals set at higher object levels, such as at the campaign level. For example, start and end date ranges 607 may be prohibited from going outside of any start or end date ranges set at the campaign level. The spend total may be set to be equal to or less than the spend total set at the campaign level, if set.

As an example, a user may set automatic budget allocation 620 across one or more data element groups and independent data elements, and automatic performance optimization for data element usage within a data element group. Optimization techniques, such as linear programming, may be used to optimize for multiple goals while staying within any number of constraints. The optimization may occur recursively up or down through the object hierarchy. A first constraint set at the campaign level may be a spend goal of $2.5 million. The start and end dates may be set as the month of October, 2014. Based on one or more campaign-level or other constraints, data element groups may be automatically or manually created corresponding to one or more audience segments.

The example campaign may contain any number of data element groups. A first data element group may correspond to would-be Toyota buyers. A user may set delivery constraints at the data element group level. For example, the user may set the spend goal for the data element group to be $1 million, and the maximum eCPM to be $15. The user may also set objectives or goals, for example a target audience of females aged 18-49, with a click-through rate goal of 2%.

A second data element group may correspond, for example, to Honda customers. A user may set delivery constraints at the data element group level. For example, the user may set the spend goal for the data element group to be $500,000, and the maximum eCPM to be $10. The user may also set objectives or goals, for example a target audience may be set to adults 18 and over, and a completion rate goal may be set to 85%. As discussed above, individual data elements may be associated with a campaign regardless of whether they are associated with a data element group. For example, the user may create an individual promotional data element with a spend goal of $500, the maximum eCPM of $12, and with an objective of minimizing cost per thousand impressions (CPM). Further, as discussed above, while the campaign may be automatically optimized, a user may manually set budgets of unaffiliated data elements, one or more data element groups and/or individual data elements within groups.

FIG. 7 is an example user interface 700 illustrating further user settings that may be configured when creating a data element group. The user may designate other objectives and/or constraints in addition to budget. For example, the user may designate impression targets or gross data element revenue targets to be automatically optimized. As a restrictive goal, the user may also designate a cap for the frequency 705 that a data element may be used in a campaign. Frequency capping may be managed at the data element group level, and may override frequency capping at the data element level. As noted previously, frequency capping may conform to the frequency capping setting from the campaign object.

Additional constraints may also be set by the user when creating a campaign, data element, or, in the example shown in FIG. 7, a data element group. The user may further set a cost per thousand impressions price cap 710. A buyer margin 715, for example a percentage of media costs and/or vendor fees, and a pass-through cost 720, such as a cost per thousand constraint, may also be designated. Pass-through costs 720 may include other costs and third party fees which may not be otherwise directly logged in application 140. Owners 305 may wish to include pass-through costs to ensure that the media cost numbers, which may be defined as the maximum bid minus any pass-through costs, are realistic. For example, if the maximum bid is $10, but there are $3 in expected data costs, up to $7 is left to be allocated for the media cost. If any of the billing fields are set, they may bind any data elements associated with the data element group. As a result, changing billing fields in the settings of associated data elements may be disabled.

Figure 8:
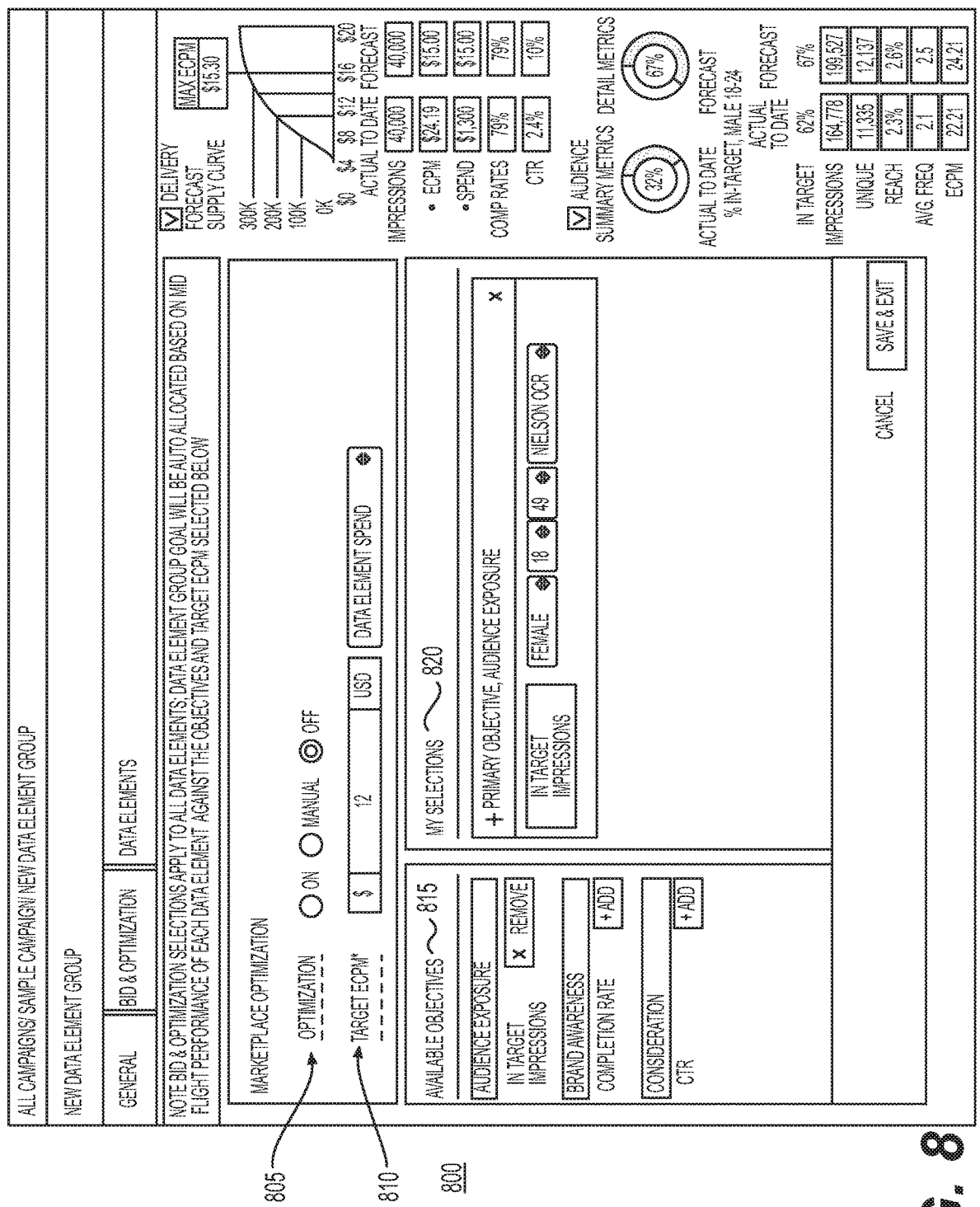
FIG. 8 is an example user interface enabling the selection of objectives associated with groups of data elements according to techniques presented herein.

FIG. 8 further illustrates the selection of objectives associated with the creation of a data element group according to techniques presented herein. Selections on the user interface 800 may be automatically applied to one or more data elements associated with the data element group. As discussed above, data element group objectives may be optimized by allocating resources based upon performance of data elements at some predetermined time period after the start of the campaign (i.e. "mid-flight"). The performance of one or more associated data elements may further be determined given any objectives and/or constraints defined in the user interface 800.

The user may select whether optimization 805 for the data element group is set to on, off, or manual. If the data elements are being used for advertising, selecting "on" may mean that the application will automatically deliver impressions based on a real-time marketplace for each data element at the lowest possible price to meet the required objectives of the data element group. Optimization 805 may be turned on by default. In order enable manual or turn off optimization 805 at the data element group level, the user may be required to turn off "Auto Allocation Across Data Elements" in user interface 600. The optimization 805 setting may automatically propagate to all data elements associated with the data element group.

The user may also select a target eCPM 810, which, as indicated by the asterisk, may be a mandatory field. As discussed above, the eCPM 810 is the effective cost per thousand impressions, and may be calculated by dividing total earning for data elements in the data element group by total number of impressions of data elements in the data element group in thousands. Associated data elements or "child data elements" may be unable to use a different target eCPM when data element group optimization 805 is turned on. The target eCPM 810 may be enforced as a restrictive ceiling. If automatic goal allocation 620 is turned off, child data elements may be able to have a different target eCPM as long as they are at or below the target eCPM goal. If automatic goal allocation 620 is turned on, the optimizer may determine the best way to allocate the budget (impression, spend or gross revenue) across any child data elements. Once enabled, a user may be restricted from editing the delivery goal, target eCPM, and/or objectives at the individual data element level.

Multiple objectives 815 may be selected by a user and ranked in the selections list 820. For example, a user may designate a primary objective, a secondary objective, a tertiary objective, etc. The data element group optimization algorithm may take the ranking into account when optimizing allocation of resources across a given set of data elements, given the assigned objectives and constraints. For example, objectives may be assigned varying weights that affect how optimization is performed. Positive factoring may be given to higher priority objectives such that the application 130 may be more likely to bid for space which meets a higher priority objective (within the maximum CPM goal or other constraints), rather than a lower priority objective.

The importance of each objective in a list or hierarchy of objectives may be reflected by the allocated bidding price. The dedicated bidding price allocated for each objective may be a weighted portion of the maximum CPM (or other budgetary constraint), while the weight of each objective may correspond to the priority level (i.e., higher priority objectives may be given higher weights). The assigned budget may also be adjusted by the achievement difficulty and rareness of a given objective.

For example, a user may designate a list of objectives 820. A primary objective may be in-target impressions of females 18 and up, a secondary objective may be a completion rate of at least 80%, and a tertiary objective may be a CTR of at least 1%. The total target eCPM 810 may be $15. Initially, a largest portion, for example 50%, of the eCPM may be automatically allocated to the primary objective, in this case the in-target objective. A second largest portion, such as 33%, may be allocated to the secondary objective. And a smallest portion, such as 17%, may be allocated to the tertiary objective. The bids may then be automatically adjusted by rareness. For example, the average in-target rate may be 25%, so in-target impressions may receive an eCPM of $30. Completed impressions may receive an eCPM of $6.25 (assuming an average completion rate of 80%), and CTR may receive $250 eCPM (assuming an average CTR of 1%).

After the campaign begins, in mid-flight the allocations may be adjusted by achievement difficulty. For example, if the secondary objective average completion rate of 80% is achieved, allocations may be increased to the primary and/or tertiary objectives to increase the likelihoods that they will also be met. In other words, allocations for objectives with a low achievement difficulty may be reduced relative to other objectives with a higher achievement difficulty. This behavior is not necessarily binary. Rather, as a given objective becomes closer to being met, the allocation may be correspondingly reduced.

Figure 9:
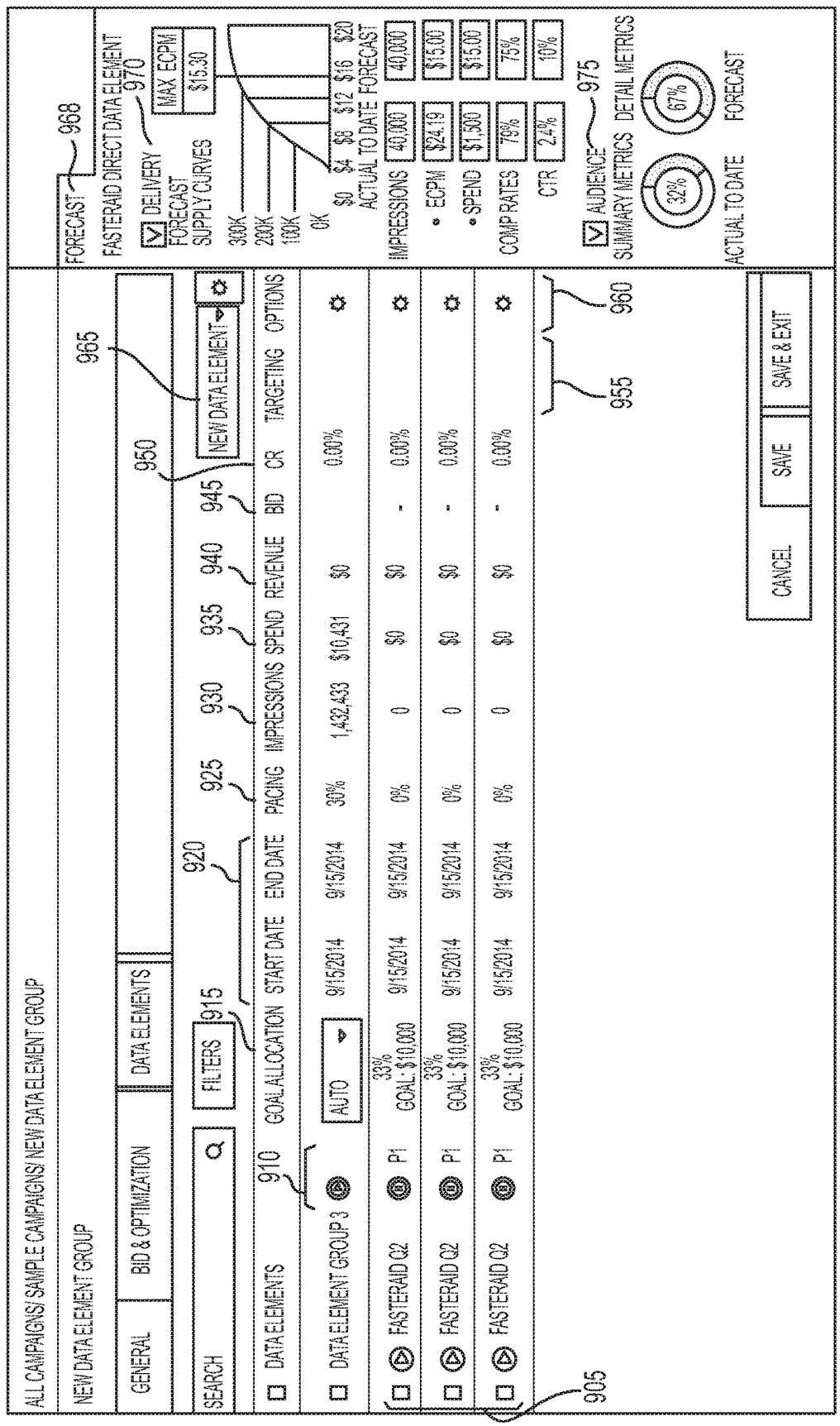
FIG. 9 is an example user interface enabling the creation and/or selection of data elements that may be associated with a data element group.

FIG. 9 is an example user interface 900 further allowing the creation, modification, and/or selection of data elements and attributes that may be associated with the creation of a data element group. The user interface 900 may list data elements associated with the data element group 905. Each data element may have an associated status indicator 910, a goal allocation 915, a start date and end date of use 920, for example if the data elements are advertisements in a campaign, a pacing percentage 925, which determines how promotional data elements are spaced out in time, a number of impressions 930, the spend total 935, the revenue generated 940, the associated bid 945, the click rate 950, the targeting 955, and other options 960 and 965. The user interface 900, along with other user interfaces presented herein, may display a forecasted delivery, such as a supply curve for eCPM. The audience for a selected data element group or data element may also be forecasted 975.

Several of these fields will now be discussed in greater detail. The goal allocation field 915 may determine how much of an available budget is intended to be spent on data elements in the data element group. If the user has selected automatic allocation 620, the default may be set to auto in the goal allocation field 915. The user may be able to set the goal allocation field 915 to manual, which may in turn switch the selection in the automatic allocation field 620 in a corresponding manner. The percentages of the goal allocation field 915 may be required to total 100%. The allocation percentages may be not editable if automatic allocation 620 is enabled, as the percentages would be decided by the optimization features of the application. If a budget has been set at the data element group level, then the budgets of all of the data elements within the data elements may be set to remain equal to or below the data element group total.

If, on the other hand, the goal allocation field 915 is set to manual, a user may be able to adjust the percentages of each data element. As a default, a manual setting may result in the first data element receiving a 100% allocation, which may then be modified by the user. The goal estimate, which may be a dollar amount under the goal allocation field 915, may be not editable by the user, and may be derived only from the percentage designated and the budget of the data element group. The sum of the allocation percentages may be set to total 100%. A user may also be able to allow a portion of the budget to be automatically allocated, and a portion to be manually allocated.

Status indicators 910 may be placed near goal allocation percentages. The status indicators 910 may be colors or symbols, such as green or red, up or down arrows, etc. The status indicators 910 may have a first status if the allocation is increasing (an indication that the data element has been determined to be more effective at reaching objectives than in previous optimization cycles), and another status if the allocation is decreasing (an indication that the data element has been determined to be less effective at reaching objectives than in previous optimization cycles). A third status may also exist if the allocation has not changed in the recent allocation cycle from a prior allocation percentage. For example, if a data element allocation is increasing, the associated status indicator may be green. If the allocation is decreasing, it may be red, and if the allocation is the same or within a predetermined distance from the same allocation, the status indicator may be gray.

A user of the application may be able to add new data elements in one or more ways, such as by clicking a button 965 on the user interface. A user may further be able to edit the settings of each data element, clone a data element (which may be automatically associated with the data element group), and/or delete data elements.

One or more user interfaces presented herein may also display a forecast window 968. A user may be able to toggle between different forecast views. A default view may be an aggregated data element group forecast. An aggregated data element group forecast is a summarized view of all child data elements. Alternatively or in addition, the application may also be able to display a forecast window for individual data elements. In response to a user clicking on an individual data element, the forecast window for the individual data element may be displayed. Similarly, clicking on a data element group may cause the aggregated data element group forecast to be displayed.

The application may also create reports about data element groups and data elements for display. Report keys may comprise one or more of: a data element group, data element group end date, data element group goal or objective, data element goal or objective type, data element group identifier, data element group pricing type, data element group start date, and a data element group type. Similar reports may be generated for individual data elements, for campaigns, or for a group of associated campaigns.

Data element group optimization will now be further discussed. At a high level, data element group optimization may involve a user inputting a strategy. Accordingly, objectives and/or constraints such as flight, budget, performance goals and associated data elements may be defined. The data elements may have a common KPI goal, which will guide the application to allocate the budget accordingly. Once the data element group has been created, promotional data elements may be run, and associated performance data may be collected, for example on a certain time interval such as on a daily basis. The budget may then be assigned across data elements based on the performance data and any constraints or restrictions (e.g. a minimum spend notwithstanding goal). The performance data may allow a determination of which data elements are better meeting the one or more objectives, such as, for example, by attracting higher click rates and/or click-through rates. The budget may be assigned for a subsequent time interval, such as for a day, and it may be reevaluated at each time interval. Alternatively, optimization may be performed in real time. Each data element may be given a training budget such that each data element may have the chance to prove itself effective, for example in an advertising scenario. A statistically significant amount of performance data for a given data element may be required to be collected before a data element's budget may be reduced below a predetermined threshold, such as being reduced to zero. Data element groups may be required to make a first budget allocation to each data element in the group within a predetermined time period, such as within 48 hours of the data element group flight. This process may iteratively loop each time interval until the campaign ends. Over time, as performance data accumulates, the application may become more aggressive in assigning resources such as budget to data elements that prove to be more effective.

For data elements with in-target goals, where there is no feedback loop, it may be assumed that if a data element is using an online campaign ratings (OCR) application, a feedback loop may be used to assess actual performance. If a data element is not using an OCR application, it may be assumed that the optimization estimates were delivered.

Possible features of the data element group optimization algorithm will now be discussed in greater detail. The algorithm may determine the selected goals of the data element group, for example budget desired, cost per thousand cap, KPI goals, flight length, etc. After the data element group has run for a period of time, such as a predetermined time interval, the achieved goals of the data element group may be determined, such as budget delivered, money spent, KPIs delivered, etc. The data element group plan for the next time interval, such as a predetermined time interval cycle, may then be determined. Based on the budget delivered, the minimal training size of the data element group may be determined. Based on the average KPI (supply), the KPI goals (demand), and the indicated priorities, the value of each KPI may be evaluated (the same as controller optimization) as a data element group buying plan. The achieved KPI of each data element in the data element group may then be read, for example, in terms of click counts, completion counts, conversion counts, etc. Achieved KPI performance data may be converted to click rate, completion rate and conversion rate, etc. Based on the achieved KPI of each data element and the determined value of each KPI, the value of each data element towards the data element group may be evaluated. The value may be determined as, for example, by multiplying the KPI of the data element by the buying plan (the buying plan may be a representation of the importance of each objective) of the data element group. The forecasted KPI of each data element in the next cycle may then be read. Based on a received or determined forecasted KPI, the opportunity risk of the value of the data element dropping may be modeled. The forecasted supply of each data element in the next cycle may then be received or determined. The budget for each data element in the data element group may then be optimized, for example by linear programming. A feasibility region within a range of constraints may be determined, and the optimum distribution of resources may further be determined in part based upon which point in the feasibility region most effectively meets the objectives. In particular, intersection points of constraint lines along edges of the feasibility region may be evaluated. The optimization may be determined, for example, using the following technique:

MAX sum(DEperform*DEbudget)
S.T sum(DEbudget)=DEGgoal
0<=sum(DEbudget*eCPM)<=DEGspend_goal
BOUNDS: DEmingoal<=DEbudget<=DEmaxsupply The objective of these equations may be to maximize the aggregated performance at the data element group level. The DEbudget may represent the budget allocated to each data element in a data element group, while DEperform may represent the performance of each data element. The constraints may be data element group level budget (DEGgoal and DEGspend_goal), and data element level supply (DEmaxsupply) and a data element configuration goal minimum (DEmingoal). The solution may then be provided to the data element level optimizer.

FIG. 10 is an example user interface 1000 configured for enabling creating and/or editing data elements that may be associated with a data element group. After selecting to create a data element in the application 140, such as one associated with a data element group, the user may be shown user interface 1000. The status 1005 of the data element may be shown as either paused or live. If a data element is changed from live to paused mid-flight (during a campaign), a warning message may be displayed, and subsequent action by the application taken, that automatic allocation will be set to 0% in the data element group user interface 900 and elsewhere. The budget may then be re-optimized for any remaining live data elements in the data element group, and/or for any data elements left in the campaign generally. A user may be prohibited from changing the status from live to paused unless he or she has also set the manual goal allocation to 0% in the data element group user interface 900.

The data element name 1010 may be designated by the user. The data element group 1015 associated with the data element may also be indicated. As discussed previously, the data element may inherit pricing and optimization criteria, as well as any other restrictions or constraints set at the data element group level.

A start date and end date 1020 (flight), in the case of published or promotional data elements, may also be displayed and input by the user. Flight dates of individual data elements may be prohibited from falling outside of the one or more flight dates of the parent data element group.

Objectives or goals 1025 may also be designated at the data element level. However, if the data element group optimization is activated, this section may be deactivated. A message may be provided to the user indicating that, to enable data element goal selection, the auto allocation across data elements 620 should be turned off. The data element group optimization algorithm may automatically allocate a subset of the data element group.

If the automatic allocation across data elements 620 is set to on, there may be no specific goals that can be added for the data element. However, the user may be able to determine a minimum level allocation per data element. For example, the user may set the minimum number of impressions that must be provided for the data element, in the case of advertising. The minimum level (along with the combined minimum levels set by other data elements) may be prohibited from exceeding the value set at the data element group level. The minimum goal may be allocated to the data element even if the data element is underperforming relative to other data elements on the selected optimization objectives. Even if a minimum goal is selected, the application optimizer may still designate a higher number if the data element outperforms other data elements in the data element group based on, for example, mid-flight performance.

Figure 11:
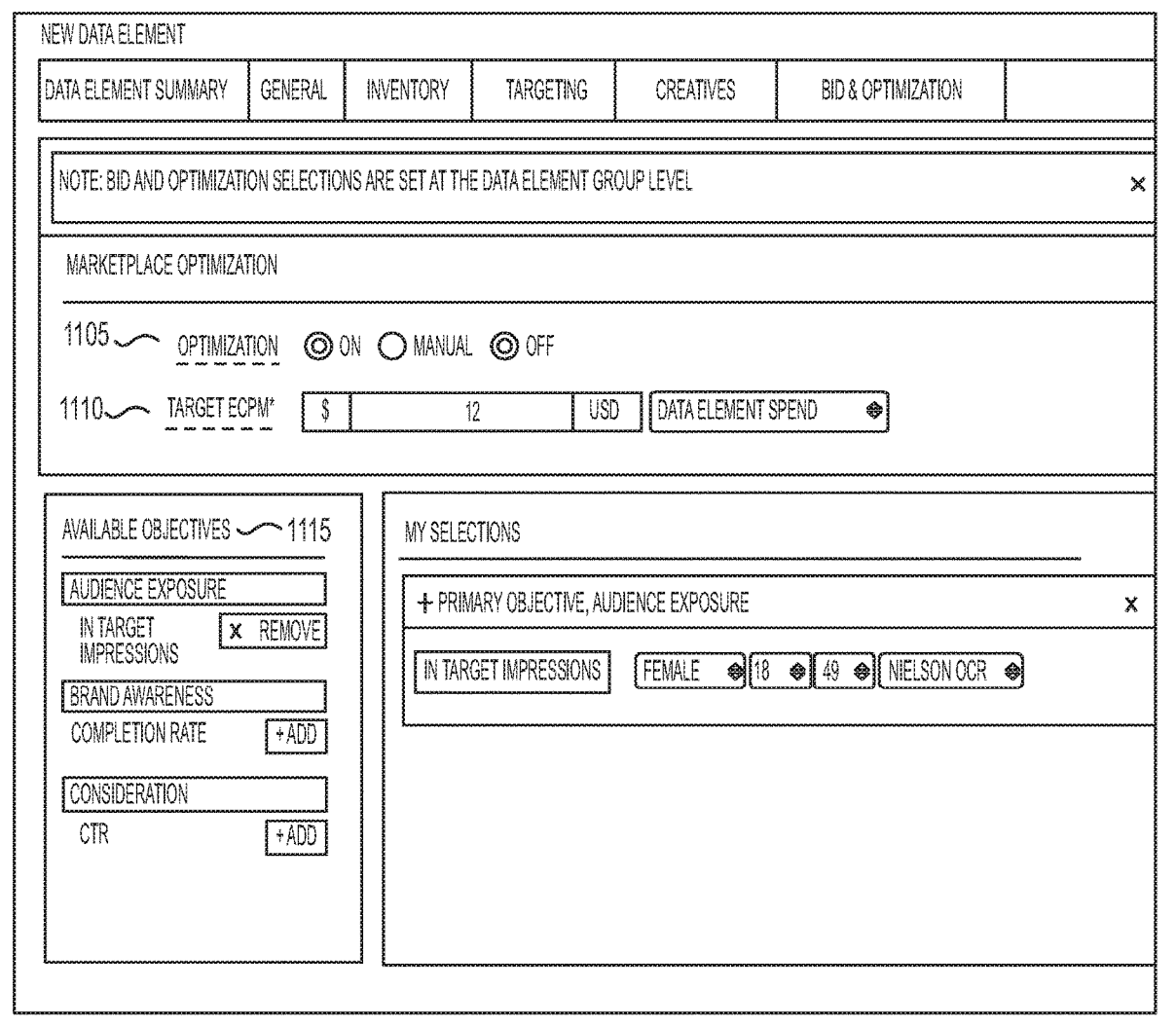

FIG. 11 is an example user interface 1100 displaying a data element bid and optimization page, which may be associated with the creation and/or editing of data element metadata, according to techniques presented herein. If the associated data element is part of a data element group with optimization 1105 turned on, the user interface 1100 may be non-editable. The user may not be able to change the target eCPM 1110 or any of the objectives 1115. If, however, automatic goal allocation is set to manual, or turned off, the user may be able to edit the target eCPM and/or objectives 1115. As a result, each data element within a data element group and campaign may be able to have different optimization goals.

As discussed above, optimization may be performed across data element groups 330, as well as across particular data elements 315, regardless of whether they are affiliated with a data element group. The objectives and/or constraints of the data element may be determined, for example, in terms of budget desired, cost per thousand impressions cap, KPI goals, flight length, etc. The achieved goals and/or constraints of the data element may also be determined, for example, in terms of budget delivered, money spent, KPI delivered, etc. The data element budget, cost per thousand impressions cap, etc., may then be determined for the next cycle, where the cycle may be a predetermined period of time. Based on the pacing of the budget goal, e.g., the rate at which the budget is being spent, the base value may be adjusted. Adjusting the base value may help keep pacing at or near 100%. The base value may represent the importance of the pacing objective. Pacing may automatically be given a non-configurable top priority, so the system may calculate a base value first. The importance of each KPI may then be determined based on the average KPI (supply, the KPI goal (demand), and/or any user-indicated priorities. The optimization algorithm may then attempt to maximize the one or more KPIs with respect to cost per thousand impressions.

Figure 12:
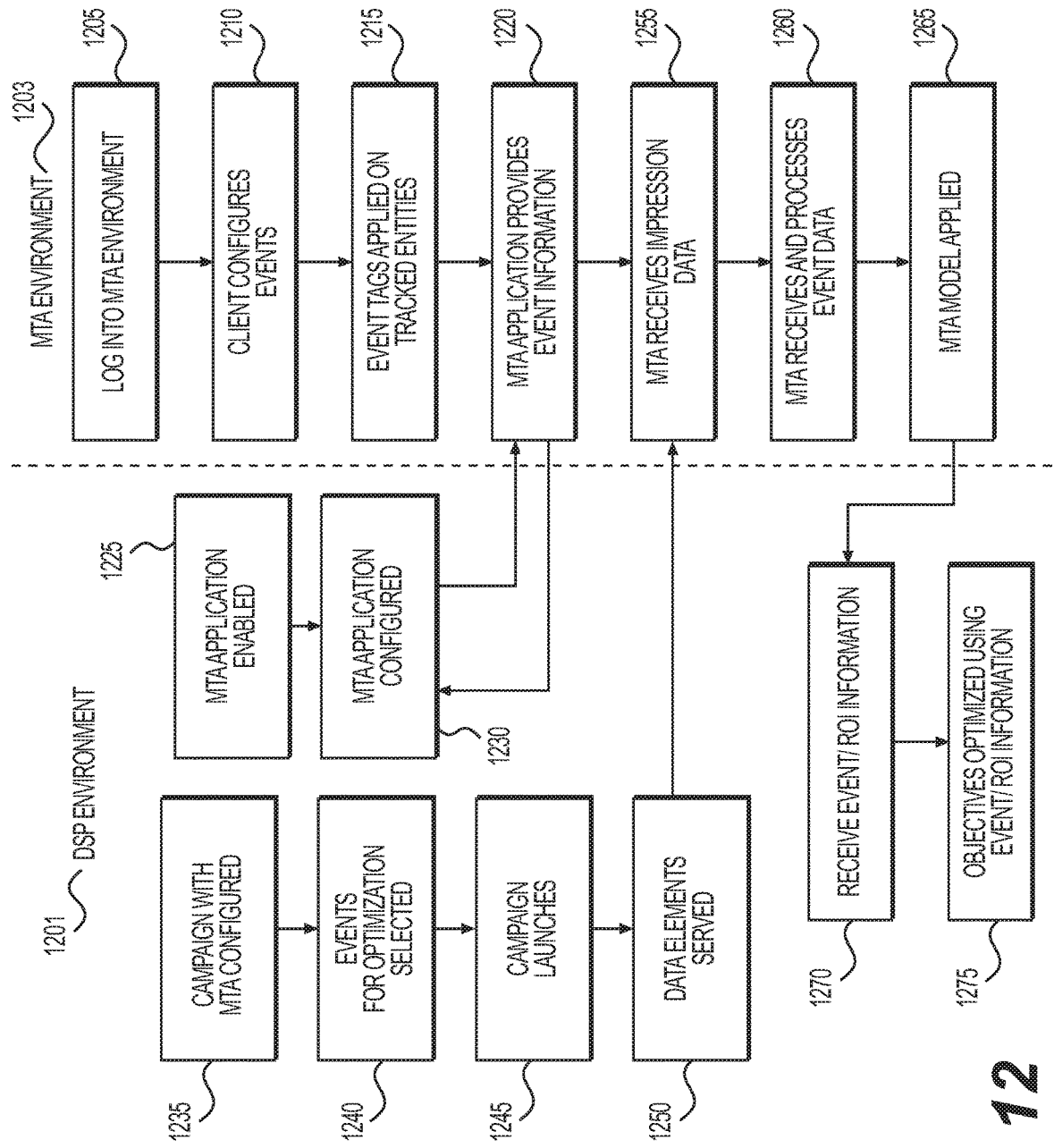
FIG. 12 is a flow diagram illustrating an example method for optimizing data element usage based on multi-touch attribution data according to techniques presented herein.

FIG. 12 is a flow diagram illustrating an example method for optimizing data element usage based on multi-touch attribution data according to techniques presented herein. The method may utilize a demand-side platform ("DSP") environment 1201 and a multi-touch attribution ("MTA") environment 1203, which may operate on a plurality of servers, for example, a publisher server 110 and an MTA server 125, respectively. Alternatively, the DSP and MTA environments may be integrated and/or run on the same server or device, such as on the publisher server 110 or the client 130. A user, who may be a privileged user and/or advertiser, may log into the MTA environment at step 1205. The one or more MTA environments 1203 may be administered by a third party. The one or more MTA environments 1203 may also provide event and/or conversion data to the DSP environment 1201 and/or client 130. For example, the one or more MTA environments 1203 may provide multi-touch attribution data to the one or more DSP environments 1201.

As stated above, the MTA environment 1203 may provide event data such as conversion data to the MTA environment 1201. As step 1210, a user may configure these events in the MTA environment. Tracking of conversion or other events may be configured using application 140, which may, for example, execute in or access the DSP environment 1201. A user may enter a tracking URL for each data element or creative, which may result in a tracking pixel or other tracking code being implemented at the data element and/or creative level. After configuration, at step 1215, event tags may be applied to tracked pages, such as data elements embedded in web pages, or other tracked entities. The event tags may comprise computer code which provide the ability to raise and log events, such as conversion events, associated with user behavior when interacting with data elements or other tracked entities. Once one or more event tags, or some other data tracking functionality, are applied, at step 1220 the MTA application, which may be a portion of application 140, may provide event information for storage and/or processing. This event information may relate to impressions provided to users, user selection of data elements, such as mouse clicks of an advertisement, conversion events, such as a user completing a purchase of a product, a user reviewing an article related to a product, etc. In the DSP environment 1201, an MTA application, operating in the MTA environment, or other features capable of receiving event information may be enabled at step 1225, for example by a user such as an advertiser. The MTA application may further be configured at step 1230. For example, a user may be required to enter credentials such as email, user name, and/or password to create a data connection with the MTA environment 1203. The data connection may occur over the network 190, and may occur via an application programming interface (API), although other types of data connections may be used. Once configured, the data connection may allow event information to be provided by the MTA environment 1203 for use in the DSP environment 1201.

When a user creates a data element group and/or campaign for which event information is tracked, at step 1235 the group and/or campaign may be configured in the DSP environment 1201. Events to be tracked for data element optimization may be selected at step 1240. Types of events which may be optimized will be discussed further below, but may include, for example, a home page click event, a sign up click event, a free trial sign up event, etc. Optimization may be performed according to techniques discussed elsewhere herein. When the campaign or data element group launches, at step 1245, listings or other indicators of data elements served or made "live" may be provided to the MTA environment 1203 at step 1250.

At step 1255, the MTA application may receive impression data corresponding to tracked pages or events. The MTA application may further receive and process event data, such as numbers of completed sales of a product or service associated with one or more data elements or the campaign, and/or related to events such as a home page click event, sign up click event, free trial sign up event, etc. At step 1265, one or more models may be applied to process impression and/or event data to generate revenue information, such as return on investment ("ROI") information. The ROI information, at step 1270, may be used by the application 140 for optimizing data element usage, and may be displayed by one or more user interfaces 150. The ROI information may be transferred from the MTA environment to the DSP environment via API, including via data push. The ROI information may also be determined in the DSP environment 1201 using data obtained from the MTA environment 1203. This may include revenue information by day or other time period, revenue information by data element, data element group, website, event, or by campaign, etc. The ROI information may be determined for each data element, data element group, etc., based on the cost and revenue or profit generated post attribution. The user interfaces 150 may also use or display data related to impressions, conversions, and/or any other event data. The event data, such as ROI information, may also be used for resource optimization, at step 1275, using optimization techniques discussed elsewhere herein.

These techniques allow for optimizing to maximize conversion by utilizing MTA data, rather than optimization by data that merely comprises last view or last click events. The application 140 may wait until a statistically significant amount of event data, such as ROI data, has accumulated before proceeding with optimization based on the ROI or other event information. The MTA environment 1203 may also signal the DSP environment 1201 when a statistically significant amount of ROI information has been obtained for a given data element, data element group, and/or campaign. The application 140 may also display a notice to a user when a statistically significant amount of event data has been gathered. The optimization may be performed on the budget, based on the ROI/conversion data and/or other optimization objectives discussed herein. The application 140 may also provide a user interface 150 that would allow a user to rank objectives, including a conversion objective, for optimization, as will be discussed further below. MTA data such as ROI data may be provided by the MTA environment 1203 on a daily basis, by some other predetermined time interval, and/or on demand.

While the steps discussed in relation to method 1200 are discussed in a certain order, many of these steps may be performed out of this order, as would be clear to a person of ordinary skill. For example, the MTA application may be enabled at step 1225 prior to conversion tags being applied to tracked pages, as in step 1215. Certain users may be restricted from enabling or disabling the MTA application. For example, a user may need to be an administrator before being able the enable the MTA application. Additional conversion events may be configured at step 1210 at any point in time. Campaigns utilizing MTA may be configured at step 1235 at any point in time. Certain steps in relation to method 1200 also may be optional. For example, the method 1200 may collect impression data at step 1255, while not collecting or utilizing conversion data, as in step 1260. As another example, while a user may receive ROI information at step 1270, optimizing objectives using this information may be optional. Further, optimization of objectives may be performed using any event-related data, not just ROI data.

Figure 13:
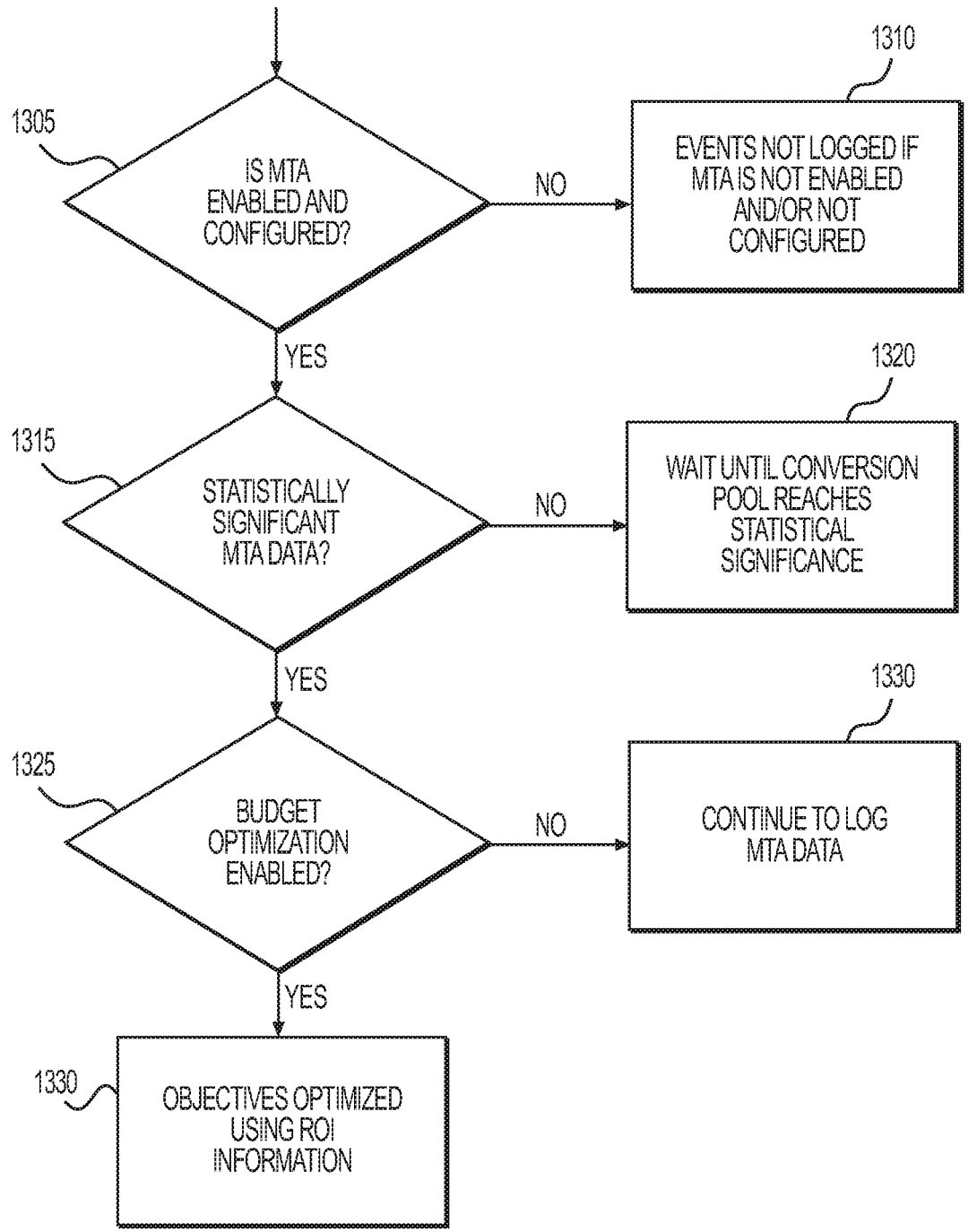
FIG. 13 is a flow diagram illustrating an example method for optimizing data element usage based on multi-touch attribution data according to techniques presented herein.

FIG. 13 is a flow diagram illustrating an example method for optimizing data element usage based on multi-touch attribution data according to techniques presented herein. Optimization using ROI data to maximize conversion, or using any other event-related data, may be unavailable unless a number of prerequisites are satisfied. At steps 1305 and 1310, if MTA is either not enabled and/or not configured, events may not be able to be stored. At steps 1315 and 1320, if the MTA data is not statistically significant, the user may be required to wait until the data pool reaches statistical significance. At steps 1325 and 1330, if optimization 805 is not enabled, the client 130, MTA server 125, publisher server 110, and/or data element server 120 may continue to log MTA data such as conversion information. At step 1330, if these requirements are met, objectives may be optimized using MTA data such as ROI information. Although the steps depicted in FIG. 13 are discussed in a certain order, the ordering may vary, and one or more steps may be optional.

Figure 14:
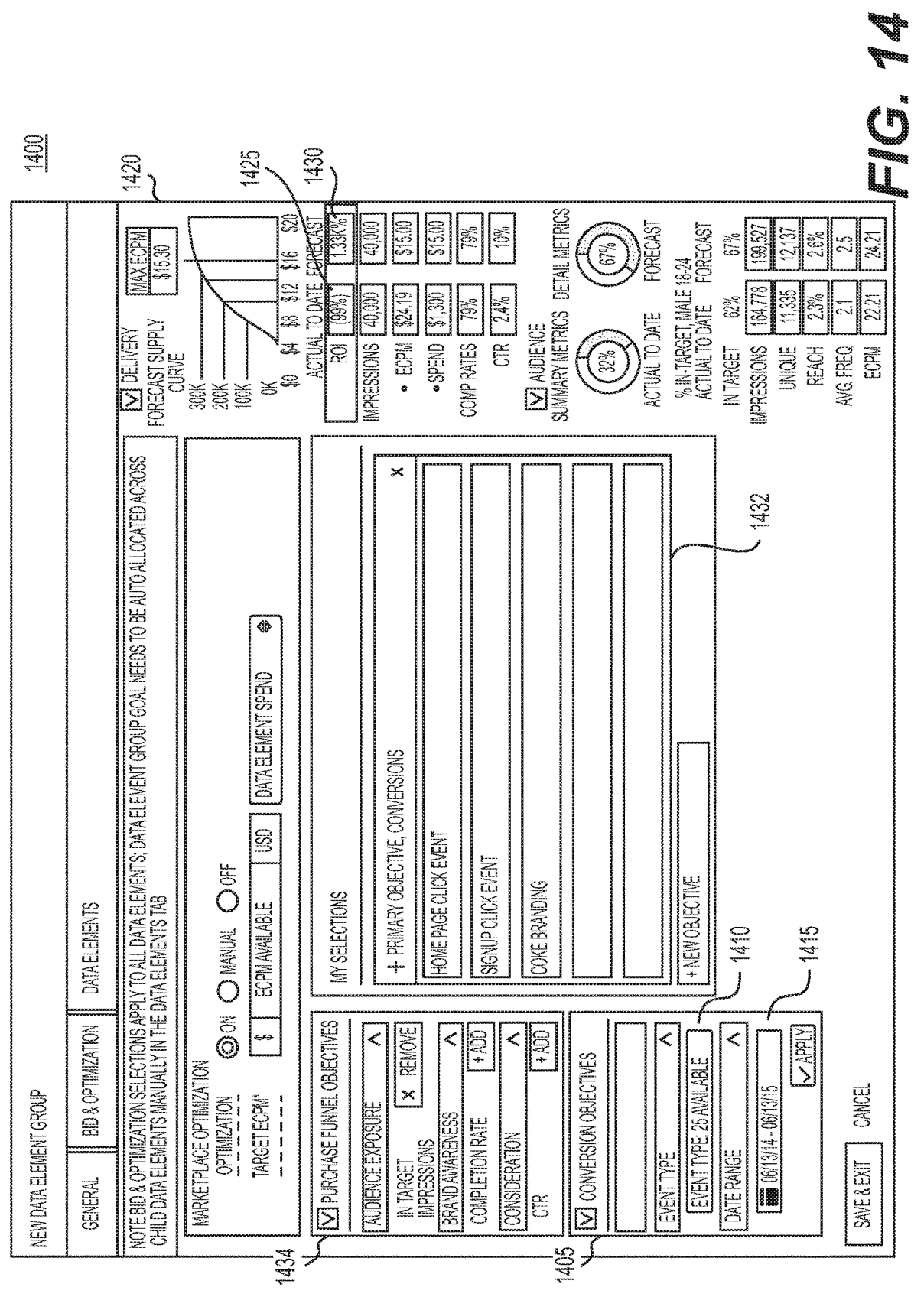

FIG. 14 is an example user interface enabling the selection of objectives associated with groups of data elements according to techniques presented herein. In addition to objectives discussed elsewhere herein, a user may also be able to designate MTA-related objectives, such as a conversion maximization objective 1405. MTA-related objectives such as conversion objectives may be designated as a primary objective, secondary objective, etc. The user interface 1400 may support enabling and optimizing against MTA data, such as ROI data, for example by data element and/or data element event. One or more event types 1410 may be selected for optimization, along with a date range 1415 of these events. Once selected, the conversion objective 1405 may be displayed along with any other objectives in the objectives display at 1432. As an example, a user may wish to optimize for revenue information for the last six months, and may select a date in the date range 1415 accordingly. A default date in the date range 1415 may be to the earliest date for which a conversion event was received. The MTA-related event data may be received via pixels embedded within or around displayed data elements. Based on the received event data, performance projections may be forecast in the user interface 1400, such as in the delivery and audience forecast areas 1420. For example, actual to-date ROI 1425 and/or forecasted ROI 1430 may be displayed. The actual ROI 1425 may be calculated as (Revenue–Spent)/Spent. The forecasted ROI may be calculated as The forecasted ROI 1430 may be determined based on revenue, event selected, and/or data element. The forecasted ROI 1430 may further be determined based on the selected events 1432 for tracking, and optimization may occur against these selected events. When a user selects a conversion objective 1405, all other objectives may be greyed out or otherwise be made unavailable, although the user may be able to add or remove event types 1410 to the conversion objective event list 1432. To add an additional objective, an additional objective group may need to be added, such as purchase funnel objectives 1434, which may be added as a secondary objective, using the example user interface of FIG. 14.

FIG. 15 is an example user interface enabling the selection of electronic events associated with groups of data elements according to techniques presented herein. When a user selects one or more event types 1410, user interface 1500 may appear and allow for the selection of events to track to meet MTA-related objectives, such as optimizing for ROI. Users may be able to search for conversion events at a search box 1505. Events which may be selectable for optimization may include 2.w app complete 1510 an email signup event 1515, a website entrance popup signup event 1520, a website exit popup signup event 1525, a selection of free trial event 1530, a selection of indeed sponsorship event 1535, and a selection of indeed sponsorship invalid code event 1540.

Figure 16:
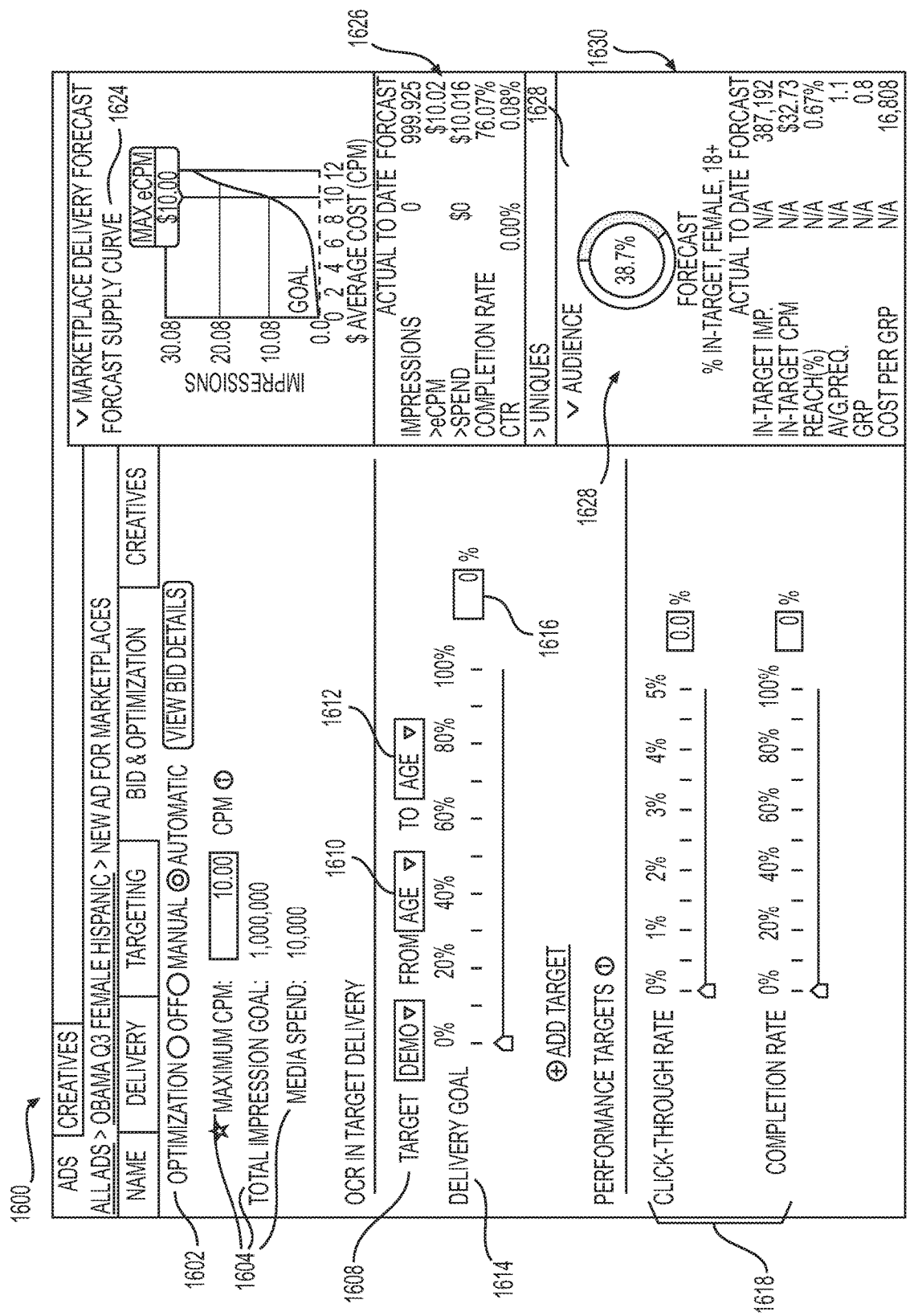

As set forth above, the audience for a selected data element group or data element may be forecasted. FIG. 16 is an example of a user interface 1600 which may allow for the creation, modification, and/or selection of data elements and attributes that may be associated with the creation of a data element group using a forecast. That is, based on the constraints and objectives that are input by a user, a forecast may be generated to determine a likelihood that selected performance objectives will be reached in a given flight based on the selected constraints. The forecast may be updated mid-flight to allow for the adjustment of a resource allocation strategy within the constraints entered by the user to increase the likelihood that the selected performance objectives will be reached. In particular, the mechanisms discussed below may provide users with the ability to forecast and optimize data elements against various metrics, including, but not limited to Nielsen Online Campaign Ratings (NOCR). In some embodiments, users may also be provided with optimized OCR in target delivery reports through various user interfaces.

Various metrics that may be provided to the user include the total number of impressions, the total number of unique impressions, male unique impressions (both in total and as a percentage of all unique impressions), female unique impressions (both in total and as a percentage as a whole), population base, reach percentage, average frequency, GRP, and cost per GRP. The population may be the population within in targeted geographical area. The reach percentage may be the ratio of unique impressions in a geographical area to the population base of the geographical area. The average frequency may be the total number of impressions in a geographical area to the number of unique impressions in the geographical area. The GRP may be the ratio of impressions in a geographical area to the population base in a geographical area. The cost per GRP may be the ratio of total money spent in a geographical area during a campaign to the GRP of the geographical area.

Targeted demographic optimization using demographic data may be part of a resource allocation optimization strategy. Forecasting and optimization using demographic data may be independent from the OCR application. In some embodiments, users may specify multiple OCR target delivery goals having equal importance, or can specify OCR target delivery goals plus performance goals each having equal or otherwise differentially-weighted importance.

Only those demographics that users selected in audience targeting may be considered for forecasting and optimization. In some embodiments, only sites that users selected for in site targeting may be considered for forecasting and optimization. Inventory that indexes high on both user segments and sites may be given a high priority, while inventory that indexes high on either user segments or sites may be given relatively similar or equal priority.

The user may select an optimization status 1602, which may reflect whether the resource allocation strategy will be optimized mid-flight based on demographic data retrieved from the demographic data server 126 (referring to FIG. 1). Optimization may be set to "off" by default. In some embodiments, optimization status 1602 may not be switched from the "off" condition if, for example, the optimizer is not configured to be usable with demographic data from the demographic data server. Optimization may also be set to "manual," whereby the user may review demographic data or other data collected mid-flight, and manually adjust the resource allocation strategy. Optimization may still further be set to "automatic" whereby the resource allocation strategy is automatically adjusted based on the demographic data collected from the demographic data server or based on other metrics collected.

The user may also select a maximum eCPM 1604, which, as indicated by the asterisk, may be a mandatory field. As discussed with reference to eCPM 810, the eCPM 1604 may be the effective cost per thousand impressions, and may be calculated by dividing total earning for data elements in the data element group by total number of impressions of data elements in the data element group in thousands. The maximum eCPM 1604 may be enforced as a restrictive ceiling for any allocation of resources by the optimizer. In some embodiments, the optimizer may select an effective eCPM to be used to submit bids on data element placement that is less than the ceiling set by the maximum eCPM 1604. That is, the optimizer may select an effective eCPM (an effective constraint) that is less than the maximum eCPM 1604 if it determines that the user's selected objectives will still be met at an eCPM lower than the maximum eCPM. The use of the lowest possible eCPM to meet a user's selected objectives may give the optimizer more flexibility mid-flight to readjust the resource allocation strategy if, for example, the forecast was too optimistic, and the effective eCPM needs to be raised. Other benefits of this strategy include allocating resources in the most effective manner possible while still reaching selected performance objectives.

The user may also select a target demographic group 1608, a first age setpoint 1610, and a second age setpoint 1612. The demographic group 1608 may be selected as either "male," "female," or "all." The "all" selection may include both males and females. The first age setpoint 1610 may be the lower bound of an age range specified within the target demographic of male, female, or all. The lower bound may be any value that is the lower bound of a target demographic range for which data is collected. For example, if data is available for age ranges of 2-11, 12-17, 18-20, 21-24, 25-29, 30-34, 35-44, 45-54, 55-64, and 65 and older, the first age setpoint may be any one of 2, 12, 18, 21, 25, 30, 35, 45, 55, and 65. The second age setpoint 1612 may be the upper bound of the age range specified within the target demographic. The upper bound may be any value that is the upper bound of a target demographic range for which data is collected. In the example set forth above, the second age setpoint may be any one of 11, 17, 20, 24, 29, 34, 44, 54, 64, and all. The value of first age setpoint 1610 and second age setpoint 1612 may also be any other suitable ages, so long as more specific data is available. The combination of a gender selection and age range may be referred to herein as a "demographic-age group."

The user may then select a delivery goal 1614 to be associated with the selected demographic group and first and second age setpoints. The delivery goal 1614 may be a performance objective, such as, e.g., a percentage of in-target impressions relative to total impressions, a percentage of unique impressions relative to total impressions, or another suitable performance objective relative to the selected demographic group and first and second age setpoints. The user may associate a weighted percentage 1616 with delivery goal 1614, when additional delivery goals are added. The weighted percentage may default to 100% when only one delivery goal 1614 is specified by a user.

The user may select additional performance targets 1618 that may be specific to the selected demographic-age groups, or that may apply to the entire data element group. In the example shown in FIG. 16, performance targets 1618 include click through rate (CTR) and completion rate, although any other suitable performance targets may be included.

A forecast supply curve 1624 may be provided, which may show a relationship between the number of impressions predicted based on eCPM. A table 1626 may show both actual and forecasted values for one or more metrics, including, but not limited to impressions, eCPM, spend total, completion rate, and click through rate. As shown in FIG. 16, the actual-to-date values may be blank if such data is not available, for example, before the flight has started. As the flight begins, and as data becomes available for in-flight performance, the actual-to-date and forecasted values may be updated.

Still further, an "Audience" display 1628 may be shown on user interface 1600. The display 1628 may show a representation of a forecasted performance objective relative to a selected demographic-age group. For example, as shown in FIG. 16, the selected demographic-age group is Females 18 and over, and the selected performance objective may be in-target impressions. In the example shown, the forecasted value of in-target impressions for Females 18 and over for this data element group at the selected constraint of $10.00 eCPM may be 38.7 percent. Other actual-to-date and forecasted values may be displayed in a table 1230 in display 1628 including, but not limited to in-target CPM, reach percentage, average frequency, GRP, and cost per GRP. As the flight begins, and as data becomes available for in-flight performance, the actual-to-date and forecasted values shown in table 1630 may be updated in a similar manner as described with reference to table 1626.

A user interface 1730 is shown in FIGS. 17 and 18. In some examples, the user interface 1730 may be shown simultaneously with one or more portions of user interface 1600 described above. User interface 1730 may include a field 1732 displaying forecasted unique impressions, which may be further subdivided into a field 1734 displaying unique male impressions, and a field 1738 displaying unique female impressions. User interface 1730 may also include a field 1736 which displays a breakdown of unique male impressions by age group (e.g., 2-11, 12-17, 18-20, 21-24, 25-29, 30-34, 35-44, 45-54, 55-64, and 65 and over). User interface 1730 may also include a field 1740 which displays a breakdown of unique female impressions by age group (e.g., 2-11, 12-17, 18-20, 21-24, 25-29, 30-34, 35-44, 45-54, 55-64, and 65 and over). In some embodiments, the total number of unique impressions for each age group may be shown. The percentage of unique impressions associated with the particular age group relative to the total number of unique impressions may also be displayed. It is further contemplated that any other data associated with each demographic-age group may be shown on user interface 1730. Still further, a table 1744 may display the population base, reach percentage, average frequency, TRP, cost per TRP, and targeted CPM, along with any other suitable metric.

User interface 1730 may also provide indications 1742 (shown in FIG. 17) and 1746 (shown in FIG. 18) based on a user's selection of a demographic-age group combination and performance objective. The indication 1742 may indicate that the selected criteria are forecasted to be satisfied by the end of the flight, while the indication 1746 may be an indication that the selected criteria are forecasted not to be satisfied by the end of the flight. The indications may be any suitable indications. In the example shown in FIGS. 17 and 18, indication 1742 may be a green check mark, and indication 1746 may be a red "X" mark, although any other suitable indication may also be utilized. In the examples shown in FIGS. 17 and 18, a user may have selected a targeted demographic-age group of Female 18-44.

In the example of FIG. 17, the user may have set a constraint of e.g., $10.00 eCPM, and performance targets of 550,000 unique impressions and an in-target impression percentage (within Females aged 18-44) of 30.0%. As shown in FIG. 17, user interface 1730 shows a forecast at the $10.00 selected eCPM level, which is predicted to meet the 550,000 impressions target. Further, the forecast predicts that within the demographic-age group of Females 18-44, that an in-target impression percentage of 33.1% may be achieved, which is the sum of the in-target impression percentages of the Female 18-20, 21-24, 25-29, 30-34, and 35-44 demographic age-groups. Because the forecast predicted that the selected performance objective (of 30.0% in-target impression percentage) could be met relative to the selected demographic age group, an indication 1742 (e.g., green checkmark) may be placed next to each of the demographic age groups selected by the user.

In the example of FIG. 18, the user may have set the same constraint of e.g., $10.00 eCPM, and performance targets of 550,000 unique impressions and an in-target impression percentage (within Females aged 18-44) of 35.0%. As shown in FIG. 18, user interface 1730 shows a forecast at the selected $10.00 eCPM level predicted to meet the 550,000 impressions target. However, the forecast predicts that within the demographic-age group of Females 18-44, that an in-target impression percentage of 33.1% may be achieved, which is the sum of the in-target impression percentages of the Female 18-20, 21-24, 25-29, 30-34, and 35-44 demographic age-groups. The data shown in FIG. 18 is the same as the data shown in FIG. 18. However, because the forecast predicted that the selected performance objectives (35.0% in-target impressions for Females 18-44) could not be met relative to the selected demographic age group, an indication 1746 (e.g., red "x" mark) may be placed next to each of the demographic age groups selected by the user.

Figure 19:
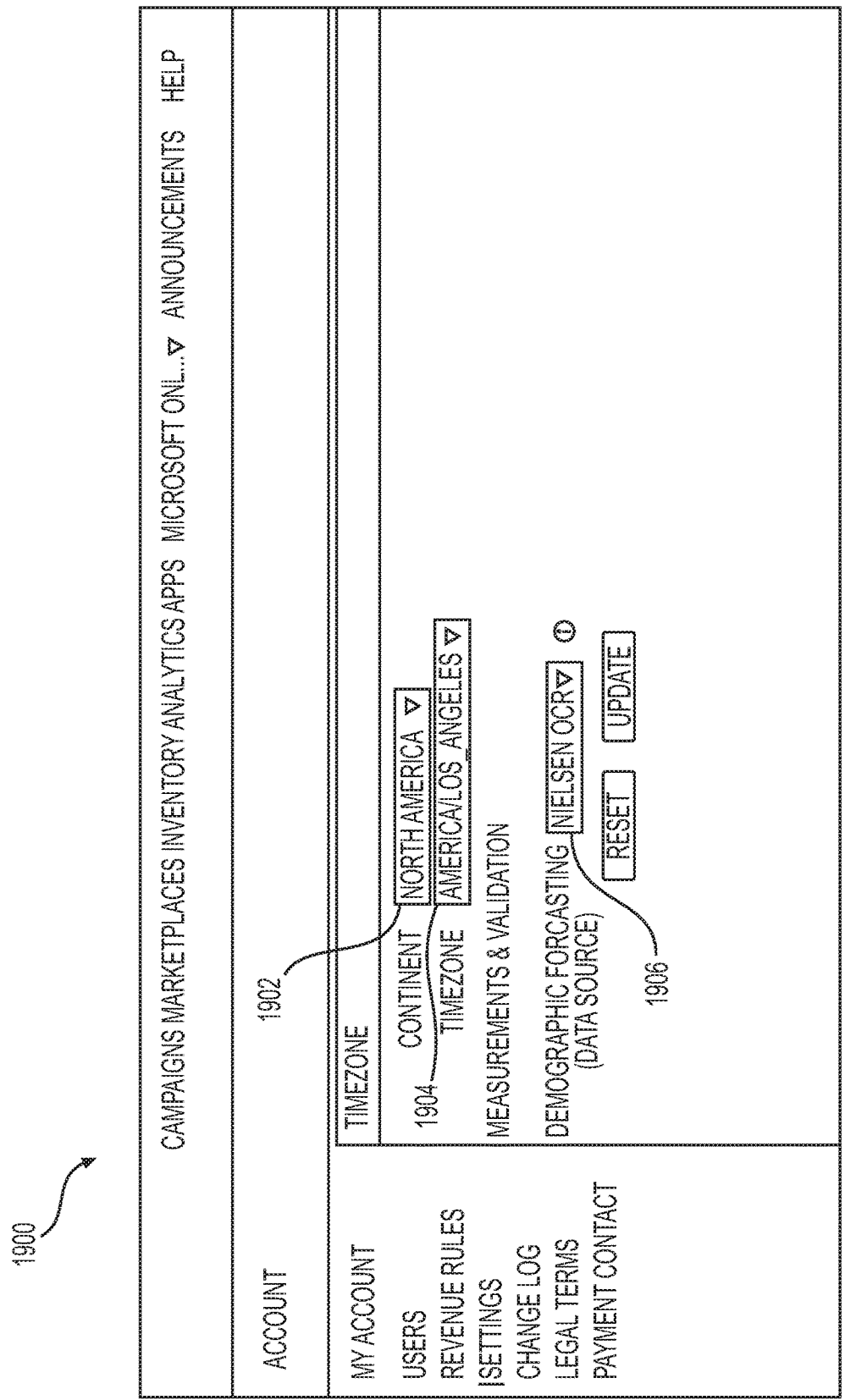
FIG. 19 is an example user interface enabling the creation of a communication link with a demographic data provider.

A user interface 1900 is shown in FIG. 19. User interface 1900 may allow a user to select one or more demographic performance data providers with which the optimizer may communicate. The user may select a continent 1902 (e.g., North America), a Time zone 1904 (e.g., Pacific Coast Time or America/Los_Angeles Time), and a demographic data provider 1906 (such as, e.g., Nielsen OCR, or Comscore VCE). The demographic data may include hybrid audience measurement metrics that help provide insights used for buying and selling media. In some examples, the demographic data may combine representative, people-based panels with tag-based measurement to deliver a holistic view of the digital universe and its audience. The result may be a metric that measures across all devices and locations, including mobile devices, tablets, secondary PCs and access points outside of home and work locations. In some examples, the user may selectively choose which devices will be targeted by the optimization and resource allocation strategy. For example, the user may determine that only certain devices will be targeted for data element placement such as, e.g., mobile telephones, tablets, and computers, while excluding, e.g., smart TVs. Subsequently, data collected from the demographic server may only correspond to the selected devices.

The demographic data may be collected by the demographic data provider using tags placed on participating publishers' pages that provide measurement of the content consumed. An advanced statistical process may provide intelligent matching of demographic characteristics to behavior across all sites, offering accurate reflection of page-level activity and audience insights based on panel data. In some examples, the demographic data may provide data including, e.g., impressions and unique impressions of a data element within specific demographic-age groups.

Figure 20:
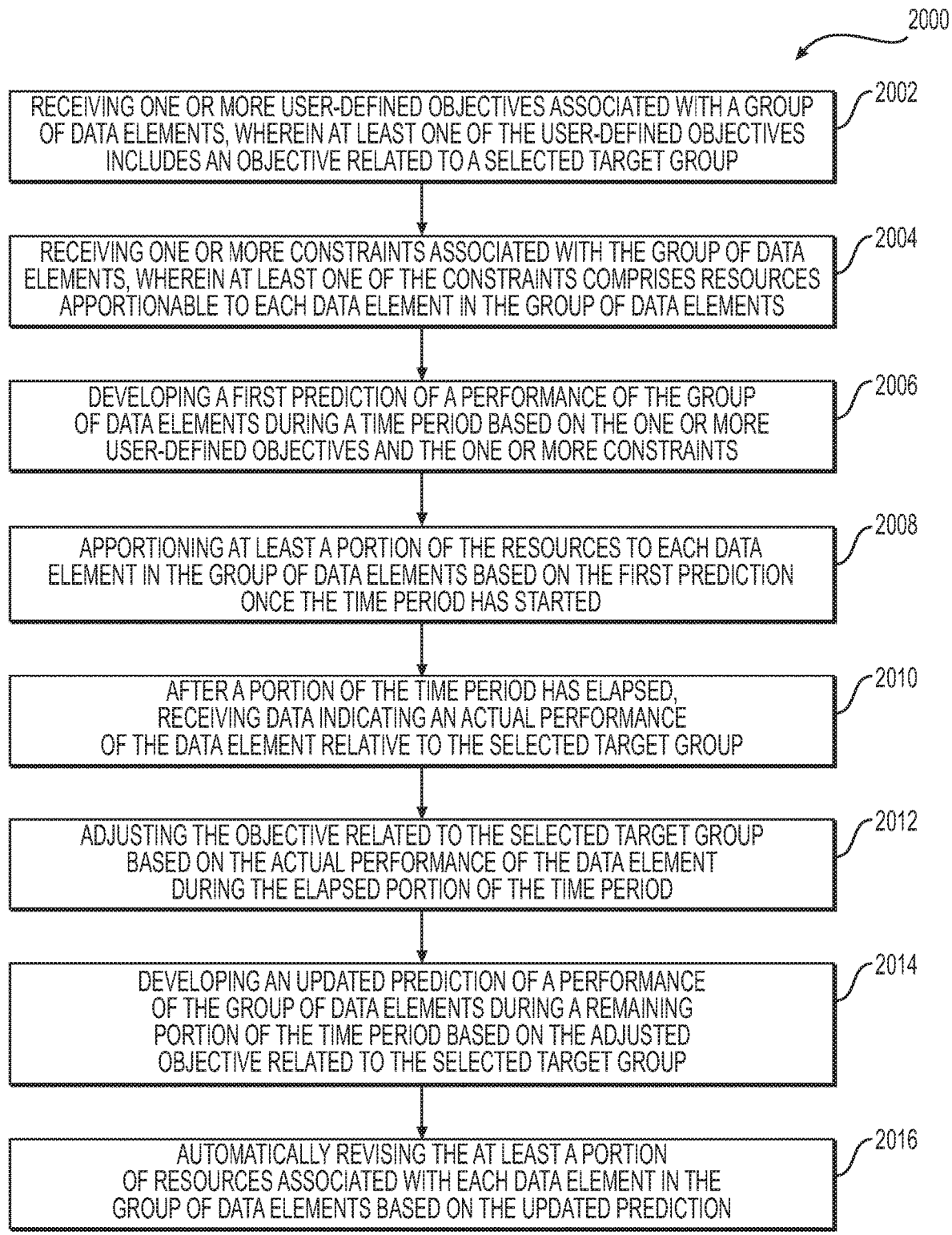
FIG. 20 is a flow diagram illustrating an example method for optimizing data element usage based on demographic data.

FIG. 20 is a flow diagram illustrating an example method 2000 for optimizing data element usage based on forecasting and demographic data according to techniques presented herein.

At step 2002, the method may include receiving one or more user-defined objectives associated with a group of data elements, wherein at least one of the user-defined objectives includes an objective related to a selected target group. The user-defined objectives may be any suitable objective described above, such as, e.g., impressions, unique impressions, among others. At least one of these user-defined objectives may be specifically related to a selected target group, such as a target demographic-age group.

At step 2004, the method also may include receiving one or more constraints associated with the group of data elements, wherein at least one of the constraints comprises resources apportionable to each data element in the group of data elements. Here, a user may input one or more of a target (e.g., maximum eCPM) and/or a maximum total amount of resources available during a flight.

From step 2004, the method may proceed to step 2006, and may include developing a first prediction of a performance of the group of data elements during a time period based on the one or more user-defined objectives and the one or more constraints. Here, the optimizer may take the user inputs (user-defined objectives and constraints) and may forecast performance of the data element over a selected time period (e.g., a flight). The optimizer may determine whether the one or more user-defined objectives are predicted to be satisfied by the end of a flight given the one or more constraints. The optimizer may provide an indication to the user as to whether or not the one or more user-defined objectives is predicted to be satisfied.

The optimizer may develop the prediction using the user inputs and by using historical data. The historical data may include inventories of data element performance. The method may use time-series technology to predict the available inventories in the given time range based on past inventories. Thus, if the user selects a flight extending over a certain time period (e.g., January through March 2016) for a particular data element, the optimizer may then predict that inventories available may correspond to inventories available during a similar time period (e.g., January through March) from previous years. The optimizer may aggregate data in any suitable manner, and may, for example, use data only from recent years. In other examples, the optimizer may determine based on other factors, that the selected flight for a particular data element will be more similar to other time periods, for example, the most recent three-month time period. The prediction may also be based on historical data related to past inventories of similar data elements. For example, if the data element is related to Honda customers, past inventories may be filtered to only include Honda customers. In other examples, past inventories may be filtered to include a broader range of similar data elements, including, for example, past inventories based on all motor vehicle customers.

Based on the predicted available inventories, the one or more user-defined objectives and one or more constraints may be used to filter the predicted available inventories to determine whether the one or more constraints can be met based on the one or more user-defined objectives. The input from the user may include advertisement targeting strategies, for example, geographical targeting, audience targeting, flight, goals, budgets, and the like. The optimizer may simulate the real data element delivery process with respect to the selected inputs and predicted inventories, and aggregate in-target probabilities based on the simulation.

During this simulation, the optimizer may predict that the one or more user-defined objectives may be satisfied under the one or more constraints (e.g., total spend and maximum eCPM). In some examples, the optimizer may predict that the user-defined objectives may still be satisfied using constraints that are lower than those set by the user. In such cases, the optimizer may then set one or more effective constraints. The one or more effective constraints may be values that are lower than the constraints set by the user that will still satisfy the user's defined objectives. For example, if the user selected constraints of a total spend of $1,000,000 and a maximum eCPM of $10.00, but the optimizer determines that the user-defined objectives can be met with a total spend of $800,000 and an eCPM of $8.00, then the user or optimizer may set an effective constraint of $800,000 and eCPM of $8.00. The use an effective constraint lower than the user-defined constraints may allow the optimizer to minimize resource allocation while still meeting the stated goals of the user. This may give the optimizer additional flexibility to re-allocate resources mid-flight should the forecast prove inaccurate, or to allow the optimizer to allocate resources to meet other objectives (e.g., secondary objectives). In those examples where the optimizer determines that the constraints are insufficient to meet the user-defined performance objectives, for example, when the optimizer believes that additional resources are required to reach a target impressions goal, the user may be notified of such a determination. In spite of this determination, the user may still choose to proceed under the selected constraints in spite of the predicted inability to meet the defined user-objectives. In these examples, the optimizer may simply optimize the selected performance objectives (e.g., target impressions) based on the selected constraints in one or more of the manners set forth above.

The method may proceed to step 2008, and may include apportioning at least a portion of the resources to each data element in the group of data elements based on the first prediction once the time period has started (e.g., once the flight has started). At step 2008, the flight may be live and resources may be actively and dynamically allocated by the optimizer according to the first prediction. This may include real-time bidding for placement of data elements using the effective constraints set in step 2006 above.

The method may proceed to step 2010, and may include, after a portion of the time period (e.g., flight) has elapsed, receiving data indicating an actual performance of the data element relative to the selected target group. The data may be received via an API connection with demographic data server 126 from a demographic data provider (as described with reference to FIG. 1). The demographic data may include real data relating to the performance of the data element during an elapsed portion of the time period (flight). The data may be screened and filtered, and only those portions of the data relating to the user-defined objectives of the user may be used by the optimizer. For example, if the user selected a target demographic-age group of female 18-24, only the performance data relating to females 18-24 will be used by the optimizer.

The method may proceed to step 2012, and may include adjusting the objective related to the selected target group based on the actual performance of the data element during the elapsed portion of the time period. That is, because a portion of the flight has elapsed, at least a portion of the user-defined objectives may be partially-satisfied, and thus may be updated by the optimizer to reflect a remaining amount of the objective which still needs to be satisfied. For example, if the user-defined objective before the start of the flight was 500,000 unique impressions in the female 18-24 demographic-age group, a survey of the demographic data from demographic data server 126 may indicate that 50,000 unique impressions have been obtained for the data element since the beginning of the flight. Thus, at this particular point of the flight, in order to meet initial objective of 500,000 unique impressions, 450,000 unique impressions may still be needed.

The method may proceed to step 2014, and may include developing an updated prediction of a performance of the group of data elements during a remaining portion of the time period based on the adjusted objective related to the selected target group. This step may be substantially similar to step 2006 set forth above, except that the optimizer may utilize adjusted totals for the one or more user-defined objectives, remaining resources available, and the like. That is, the optimizer may determine whether the initial objectives are still obtainable given the constraints set by the user. If the initial prediction developed at step 2006 was accurate, the optimizer may determine that the initial objectives (or the updated objective over a remaining portion of the time period) may still be met given the constraints set by the user and/or the effective constraints determined by the optimizer. In such examples, no change may be required by the optimizer.

However, if the updated prediction indicates that the effective constraints could be changed, or otherwise that the user-defined objectives cannot be met, the method may proceed to step 2016, and may include automatically revising the at least a portion of resources associated with each data element in the group of data elements based on the updated prediction.

If, for example, the updated prediction indicates that even lower effective constraints could be used while still satisfying the user-defined objectives, the optimizer may set the effective constraints to lower levels (e.g., lower total spend or lower eCPM values). This may happen when the data element performance in the selected demographic-age group exceeded the expectations of the initial prediction. In another example, if the updated prediction indicates that a higher effective constraint is needed to satisfy the user-defined objectives, the optimizer may raise the effective constraints to higher levels that do not exceed the constraint limits set by the user. Thus, if the effective constraint was initially set by the optimizer to be $800,000 and an eCPM of $8.00, but the optimizer determines that those levels need to be raised to total spend of $900,000 and eCPM of $9.00, the optimizer may do so unless the values required to meet the objectives exceed the constraints set by the user. In such examples where values required to satisfy the user-defined objectives exceed the limits set by the constraints, the optimizer may send a notification to the user, and/or may otherwise set the effective constraint up to the limits set by the user.

Steps 2010 to 2016 may be repeated at predetermined intervals as set forth by a user. For example, steps 2010 to 2016 may be repeated daily or at any other suitable interval. In some examples, new data may be available from the demographic data provider only once per day, and thus steps 2010 to 2016 may only be performed once per day. In some examples, when multiple demographic data providers are used by the optimizer, steps 2010 to 2016 may be repeated multiple times per day (e.g., once each demographic provider provides new data).

Example

The following example illustrates how a resource allocation strategy and forecast may be affected by user inputs and constraints. The forecast and resource allocation strategies discussed herein rely on guidance by the user in the form of KPI goals and priorities (CTR, CR, in-target reach, conversion rate, etc.), which represents the expectations of the user. The initial guidance of the user may have significant impact on the automated resource allocation strategy.

For example, if the user sets up the forecasting with expectation of in-target reach, then the forecasting result will show high in-target reach with high cost (but within user budget or constraint).

For example, assume we set up two identical data elements as follows: data element 1 is set up as eCPM=$10, impression goal=1,000,000 with Female 18-49 as targeted demographic-age group, while data element 2 is set up as eCPM=$10, impression goal=1,000,000 without a targeted demographic-age group. The forecasting of data element 1 may result in an effective eCPM=$9.7, impressions=1,000,000, with in-target reach=40%, while ad 2 may result in an effective eCPM=$5, impressions=1,000,000 with in-target reach=100%. Thus, the different demographic targeting group may lead to different forecasting because of the difficulties to reach different (including smaller) demographic-age groups.

Expanding on the previous example, given a data element 3 with eCPM=$10, impression goal=1,000,000 with Male 18-49 as demographic audience, the forecasting result in an effective eCPM=$9.3, impressions=1,000,000 with in-target reach=55%. That is, for the given data element, it may be easier to reach males aged 18-49 than females aged 18-49.

The priority of the initial user-defined objectives may also have impact on the forecasting result. If data element 4 has CTR as its primary goal and in-target impressions as a secondary goal, while data element 5 has in-target impressions as a primary goal and CTR as secondary goal, assuming the rest of the constraints and objectives are the same, the forecast may show a different result. For example, the forecast may show data element 4 with higher CTR (for example 2%) and a lower in-target reach (30%), while data element 5 may be forecast with higher in-target reach (45%), but lower CTR (for example 1%).

Techniques presented herein may provide a differentiated buying tool allowing one or more owners 305 to purchase space for promotional data elements 315 that may eliminate substantial manual work and provide real-time optimal allocation of resources to data elements. In addition, the optimization algorithm may work recursively up or down the object hierarchy, thus increasing the efficiency of optimization according to objectives and/or constraints. While many settings discussed herein may be able to be set at the data element group level, these same settings may be set at the campaign level and/or data element level, unless expressly stated otherwise herein. More generally, any setting which may be configured at any level of the object hierarchy may also be configured at any other level of the object hierarchy, unless expressly stated otherwise herein. All user interfaces shown herein, or combinations thereof, may be present in various embodiments, and may be presented to one or more users. All features discussed herein may have associated security requirements before they may be used. For example, different users of the application may have different levels of privileges, allowing them to access differing features of the application. In addition, many steps of techniques discussed herein are disclosed in a particular order. In general, steps discussed may be performed in any order, unless expressly stated otherwise.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for systems and a methods for optimizing data element usage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for optimizing distribution of resources for data elements, comprising:
   receiving one or more hierarchical ranked user-defined objectives associated with a group of data elements, wherein at least one of the user-defined objectives includes an objective related to a selected target group;
   receiving one or more constraints associated with the group of data elements, wherein at least one of the constraints comprises resources apportionable to each data element in the group of data elements;
   developing a first prediction ratio of a performance of the group of data elements during a time period based on the one or more hierarchical ranked user-defined objectives and the one or more constraints based on a ratio of impressions in a predetermined area to a population of the predetermined area;
   apportioning at least a portion of the resources to each data element in the group of data elements based on the first prediction ratio once the time period has started;
   after a portion of the time period has elapsed, receiving data indicating an actual performance ratio for the predetermined area of the data element relative to the selected target group;
   adjusting the objective related to the selected target group based on the actual performance ratio for the predetermined area of the data element during the elapsed portion of the time period;
   developing an updated prediction ratio of a performance of the group of data elements during a remaining portion of the time period based on the adjusted objective related to the selected target group, the updated prediction ratio being based on a ratio of impressions in the predetermined area to the population of the predetermined area; and
   automatically optimizing the distribution of resources by recursively revising the at least a portion of resources associated with each data element in the group of data elements based on the updated prediction ratio.

2. The computer-implemented method of claim 1, wherein the first prediction ratio is developed by simulating the performance of the group of data elements under the one or more constraints in an environment that simulates available data element inventories based on previously available data element inventories.

3. The computer-implemented method of claim 2, wherein the data elements are configured to be associated with a data element inventory by apportioning resources to an owner of the data element inventory.

4. The computer-implemented method of claim 1, wherein the selected target group includes a gender selection of male, female, or male and female, and an age group selection.

5. The computer-implemented method of claim 4, wherein the actual performance of the data element relative to the selected target group includes a performance of the data element among persons within the gender selection and the age group selection.

6. The computer-implemented method of claim 1, wherein receiving data indicating the actual performance ratio for the predetermined area of the data element during the elapsed portion of the time period includes establishing a connection with a third party server configured to collect the number of impressions collected by the data element during the elapsed portion of the time period.

7. The computer-implemented method of claim 1, wherein developing the first prediction ratio includes determining whether the one or more hierarchical ranked user-defined objectives can be met using a lower constraint than the one or more constraints, and if so, apportioning the resources to each data element in the group of data elements using the lower constraint as an effective constraint.

8. The computer-implemented method of claim 7, wherein automatically revising the at least a portion of resources associated with each data element in the group of data elements based on the updated prediction ratio includes using a higher constraint than the effective constraint if the updated prediction ratio determines that the one or more hierarchical ranked user-defined objectives can no longer be met using the effective constraint.

9. The computer-implemented method of claim 1, wherein automatically revising the at least a portion of resources associated with each data element in the group of data elements based on the updated prediction ratio includes using a lower constraint than the one or more constraints if the updated prediction ratio determines that the one or more hierarchical ranked user-defined objectives can be met using a lower constraint.

10. The computer-implemented method of claim 1, wherein apportioning at least a portion of the resources to each data element in the group of data elements includes associating each data element in the group of data elements with an available data element inventory using a portion of the resources.

11. A system for optimizing distribution of resources for data elements, comprising:
a data storage device storing instructions for optimizing distribution of resources to data elements; and
a processor configured to execute the instructions to perform a method including:
receiving one or more hierarchical ranked user-defined objectives associated with a group of data elements, wherein at least one of the user-defined objectives includes an objective related to a selected target group;
receiving one or more constraints associated with the group of data elements, wherein at least one of the constraints comprises resources apportionable to each data element in the group of data elements;
developing a first prediction ratio of a performance of the group of data elements during a time period based on the one or more hierarchical ranked user-defined objectives and the one or more constraints based on a ratio of impressions in a predetermined area to a population of the predetermined area;
apportioning at least a portion of the resources to each data element in the group of data elements based on the first prediction ratio once the time period has started;
after a portion of the time period has elapsed, receiving data indicating an actual performance ratio for the predetermined area of the data element relative to the selected target group;
adjusting the objective related to the selected target group based on the actual performance ratio for the predetermined area of the data element during the elapsed portion of the time period;
developing an updated prediction ratio of a performance of the group of data elements during a remaining portion of the time period based on the adjusted objective related to the selected target group, the updated prediction ratio being based on a ratio of impressions in the predetermined area to the population of the predetermined area; and
automatically optimizing the distribution of resources by recursively revising the at least a portion of resources associated with each data element in the group of data elements based on the updated prediction ratio.

12. The system of claim 11, wherein the first prediction ratio is developed by simulating the performance of the group of data elements under the one or more constraints in an environment that simulates available data element inventories based on previously available data element inventories.

13. The system of claim 12, wherein the data elements are configured to be associated with a data element inventory by apportioning resources to an owner of the data element inventory.

14. The system of claim 11, wherein the selected target group includes a gender selection of male, female, or male and female, and an age group selection.

15. The system of claim 14, wherein the actual performance of the data element relative to the selected target group includes a performance of the data element among persons within the gender selection and the age group selection.

16. A non-transitory computer readable medium storing instructions that, when executed by a processor, cause the processor to perform a method of optimizing distribution of resources for data elements, the method including:
receiving one or more hierarchical ranked user-defined objectives associated with a group of data elements, wherein at least one of the user-defined objectives includes an objective related to a selected target group;
receiving one or more constraints associated with the group of data elements, wherein at least one of the constraints comprises resources apportionable to each data element in the group of data elements;
developing a first prediction ratio of a performance of the group of data elements during a time period based on the one or more hierarchical ranked user-defined objectives and the one or more constraints based on a ratio of impressions in a predetermined area to a population of the predetermined area;
apportioning at least a portion of the resources to each data element in the group of data elements based on the first prediction ratio once the time period has started;
after a portion of the time period has elapsed, receiving data indicating an actual performance ratio for the predetermined area of the data element relative to the selected target group;

adjusting the objective related to the selected target group based on the actual performance ratio for the predetermined area of the data element during the elapsed portion of the time period;

developing an updated prediction ratio of a performance of the group of data elements during a remaining portion of the time period based on the adjusted objective related to the selected target group, the updated prediction ratio being based on a ratio of impressions in the predetermined area to the population of the predetermined area; and automatically optimizing the distribution of resources by recursively revising the at least a portion of resources associated with each data element in the group of data elements based on the updated prediction ratio.

17. The non-transitory computer readable medium of claim 16, wherein the first prediction ratio is developed by simulating the performance of the group of data elements under the one or more constraints in an environment that simulates available data element inventories based on previously available data element inventories.

18. The non-transitory computer readable medium of claim 17, wherein the data elements are configured to be associated with a data element inventory by apportioning resources to an owner of the data element inventory.

19. The non-transitory computer readable medium of claim 16, wherein the selected target group includes a gender selection of male, female, or male and female, and an age group selection.

20. The non-transitory computer readable medium of claim 19, wherein the actual performance of the data element relative to the selected target group includes a performance of the data element among persons within the gender selection and the age group selection.

* * * * *